(12) United States Patent
Li et al.

(10) Patent No.: US 11,046,586 B2
(45) Date of Patent: Jun. 29, 2021

(54) ZEOLITE WITH TUNED ALUMINUM CONTENT AND MESOPOROSITY

(71) Applicant: W. R. Grace & Co.-CONN, Columbia, MD (US)

(72) Inventors: Kunhao Li, Princeton, NJ (US); Javier Garcia-Martinez, Alicante (ES)

(73) Assignee: W.R. Grace & Co.-CONN, Columbia, MD (US)

( * ) Notice: Subject to any disclaimer, the term of this patent is extended or adjusted under 35 U.S.C. 154(b) by 0 days.

(21) Appl. No.: 16/852,169

(22) Filed: Apr. 17, 2020

(65) Prior Publication Data
US 2020/0239323 A1 Jul. 30, 2020

Related U.S. Application Data

(62) Division of application No. 14/983,901, filed on Dec. 30, 2015, now Pat. No. 10,626,019.
(Continued)

(51) Int. Cl.
*C01B 39/38* (2006.01)
*C01B 39/40* (2006.01)
(Continued)

(52) U.S. Cl.
CPC ............ *C01B 39/06* (2013.01); *C01B 39/026* (2013.01); *C01B 39/20* (2013.01); *C01B 39/205* (2013.01); *C01B 39/26* (2013.01); *C01B 39/265* (2013.01); *C01B 39/32* (2013.01); *C01B 39/38* (2013.01); *C01B 39/40* (2013.01); *C01B 39/46* (2013.01);
(Continued)

(58) Field of Classification Search
CPC ....... C01B 39/38; C01B 39/40; C01B 39/026; B01J 29/40; C01P 2006/14; C01P 2006/16; C01P 2006/17
See application file for complete search history.

(56) References Cited

U.S. PATENT DOCUMENTS

| 3,709,853 A | 1/1973 | Karapinka |
| 3,864,280 A | 2/1975 | Schneider |

(Continued)

FOREIGN PATENT DOCUMENTS

| JP | 2002128517 | 5/2002 |
| JP | 2004143026 | 5/2004 |

(Continued)

OTHER PUBLICATIONS

Al-Khattaf, S. et al., The Role of Diffusion in Alkyl-Benzenes Catalytic Cracking, Appl. Catal. A: Gen. 226; 139-153, (2002).
(Continued)

*Primary Examiner* — David M Brunsman
(74) *Attorney, Agent, or Firm* — Hovey Williams LLP; Kameron D. Kelly

(57) ABSTRACT

Compositions and methods for preparing mesoporous and/or mesostructured materials from low SAR zeolites are provided herewith. In particular, methods are provided that involve: (a) providing a low SAR zeolite, (b) optionally subjecting the low SAR zeolite to an acid framework modification, and (c) subjecting the framework-modified zeolite to a mesopore formation treatment. The resulting mesoporous zeolites can have bi-modal mesoporosity and higher aluminum contents relative to existing mesoporous zeolites.

9 Claims, 11 Drawing Sheets

Related U.S. Application Data

(60) Provisional application No. 62/098,157, filed on Dec. 30, 2014.

(51) Int. Cl.

| | | |
|---|---|---|
| *C01B 39/06* | (2006.01) | |
| *C01B 39/20* | (2006.01) | |
| *C01B 39/26* | (2006.01) | |
| *C01B 39/32* | (2006.01) | |
| *C01B 39/02* | (2006.01) | |
| *C01B 39/48* | (2006.01) | |
| *C01B 39/46* | (2006.01) | |
| *B01J 29/40* | (2006.01) | |

(52) U.S. Cl.
CPC ............... *C01B 39/48* (2013.01); *B01J 29/40* (2013.01); *C01P 2006/14* (2013.01); *C01P 2006/16* (2013.01); *C01P 2006/17* (2013.01)

(56) References Cited

U.S. PATENT DOCUMENTS

| | | |
|---|---|---|
| 4,016,218 A | 4/1977 | Haag et al. |
| 4,088,671 A | 5/1978 | Kobylinski |
| 4,196,182 A | 4/1980 | Willermet et al. |
| 4,205,055 A | 5/1980 | Maire et al. |
| 4,263,268 A | 4/1981 | Knox et al. |
| 4,318,824 A | 3/1982 | Turner |
| 4,439,349 A | 3/1984 | Everett et al. |
| 4,564,207 A | 1/1986 | Russ et al. |
| 4,609,972 A | 9/1986 | Edeling et al. |
| 4,637,623 A | 1/1987 | Bubik |
| 4,689,314 A | 8/1987 | Martinez et al. |
| 4,704,375 A | 11/1987 | Martinez et al. |
| 4,761,272 A | 8/1988 | Hucke |
| 4,775,655 A | 10/1988 | Edwards et al. |
| 4,806,689 A | 2/1989 | Gier et al. |
| 4,816,135 A | 3/1989 | Martinez et al. |
| 4,836,737 A | 6/1989 | Holmes et al. |
| 4,857,494 A | 8/1989 | Martinez et al. |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Duguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |

(56) References Cited

U.S. PATENT DOCUMENTS

| | | | |
|---|---|---|---|
| 6,770,258 B2 | 8/2004 | Pinnavaia et al. | |
| 6,793,911 B2 | 9/2004 | Koegler et al. | |
| 6,797,153 B1 | 9/2004 | Fukuyama et al. | |
| 6,797,155 B1 | 9/2004 | Chester et al. | |
| 6,800,266 B2 | 10/2004 | Pinnavaia et al. | |
| 6,809,061 B2 | 10/2004 | Bogdan et al. | |
| 6,811,684 B2 | 11/2004 | Mohr et al. | |
| 6,814,943 B2 | 11/2004 | Radcliffe et al. | |
| 6,818,589 B1 | 11/2004 | Gillespie | |
| 6,833,012 B2 | 12/2004 | Rogers | |
| 6,841,143 B2 | 1/2005 | Inagaki et al. | |
| 6,843,906 B1 | 1/2005 | Eng | |
| 6,843,977 B2 | 1/2005 | Pinnavaia et al. | |
| 6,846,546 B2 | 1/2005 | Kuroda et al. | |
| 6,866,925 B1 | 3/2005 | Chane-Ching | |
| 6,869,906 B2 | 3/2005 | Pinnavaia et al. | |
| 6,936,234 B2 | 8/2005 | Bilenko | |
| 6,998,104 B2 | 2/2006 | Tao et al. | |
| 7,084,087 B2 | 8/2006 | Shan et al. | |
| 7,589,041 B2 | 9/2009 | Ying et al. | |
| 7,807,132 B2 | 10/2010 | Garcia-Martinez | |
| 7,976,696 B2 | 7/2011 | Ying et al. | |
| 8,007,663 B2 | 8/2011 | Ying et al. | |
| 8,008,223 B2 | 8/2011 | Garcia-Martinez | |
| 2001/0024635 A1* | 9/2001 | Beck | C07C 5/2702 423/700 |
| 2001/0031241 A1 | 10/2001 | Lacombe et al. | |
| 2001/0042440 A1 | 11/2001 | Miyazawa et al. | |
| 2003/0054954 A1 | 3/2003 | Chane-Ching et al. | |
| 2004/0067842 A1 | 4/2004 | Pinnavaia et al. | |
| 2004/0138051 A1 | 7/2004 | Shan et al. | |
| 2004/0179996 A1 | 9/2004 | Shan et al. | |
| 2005/0074396 A1 | 4/2005 | Takahashi et al. | |
| 2005/0130827 A1 | 6/2005 | Schunk | |
| 2005/0214539 A1 | 9/2005 | Ying et al. | |
| 2006/0078487 A1 | 4/2006 | Endo et al. | |
| 2007/0244347 A1 | 10/2007 | Ying et al. | |
| 2009/0110631 A1 | 4/2009 | Garcia-Martinez | |
| 2010/0190632 A1 | 7/2010 | Dight | |
| 2010/0196263 A1 | 8/2010 | Garcia-Martinez | |
| 2011/0118107 A1 | 5/2011 | Garcia-Martinez | |
| 2011/0171121 A1 | 7/2011 | Senderov | |
| 2012/0258852 A1* | 10/2012 | Martinez | B01J 35/1061 502/60 |

FOREIGN PATENT DOCUMENTS

| | | |
|---|---|---|
| WO | 2001017901 | 3/2001 |
| WO | 2001038223 | 5/2001 |
| WO | 2005102964 | 11/2005 |
| WO | 2006031259 | 3/2006 |
| WO | 2006/038912 | 4/2006 |

OTHER PUBLICATIONS

Bagri, R. et al.; Catalytic Pyrolysis of Polyethylene; Anal. Pyrolysis, 63:29-41 (2002).

Conway, B.E, Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.

Corma, A., From Microporous to Mesoporous Molecular Sieve Materials and Their Use in Catalysis, Chem. Rev., 97:2373-2419, (1997).

CSIC NM014—Method of Preparation of Mesoporous Alumina with High Thermal Stability, http://www.serina.es/escaparate/verproducto.cgi?idproducto=4980&refcompra=NULO, downloaded May 9, 2007, 2 pages.

Davis, M.E, Ordered Porous Materials for Emerging Applications, Nature, 417:813-821 (2002).

Davis, M.E, Zeolite and Molecular Sieve Synthesis, Chem. Mater., 4:756-768 (1992).

De Moor, P-P.E.A. et al., Imaging the Assembly Process of the Organic-Mediated Synthesis of a Zeolite, Chem. Eur. J., 5(7):2083-2088 (1999).

Degnan, T.F. et al., History of ZSM-5 Fluid Catalytic Cracking Additive Development at Mobile, Microporous Mesoporous Mater., 35-36:245-252 (2000).

De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).

Galo, J. de A. A. et al., Chemical Strategies to Design Textured Materials: from Microporous and Mesoporous Oxides to Nanonetworks and Hierarchical Structures, Chern. Rev., 2002, 102, 4093-4138.

Geidel, E. et al., Characterization of Mesoporous Materials by Vibrational Spectroscopic Techniques, Microporous and Mesoporous Mater., 65:31-42 (2003).

Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).

Goto, Y., Mesoporous Material from Zeolite, Journal of Porous Materials, 9, 2002, pp. 43-48.

Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.

Harding, R.H. et al., New Developments in FCC Catalyst Technology, Appl. Catal. A:Gen. 221:389-396 (2001).

Huang, L. et al., Investigation of Synthesizing MCM-41/ZSM Composites, J. Phys. Chem. B. 104:2817-2823 (2000).

Ijima, S., Carbon Nanotubes: Past, Present, and Future, Physica B: Condensed Matter, www.elsevier.com/locate/physb, 2002, 323, pp. 1-5.

International Search Report and Written Opinion dated Nov. 7, 2005 from International Patent Application No. PCT/US2005/05918, filed Feb. 25, 2005.

Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al. Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al.,Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

(56) References Cited

OTHER PUBLICATIONS

Mendes, M.F. et al., Optimization of the Process of Concentration of Vitamin E from DDSO using Supercritical CO2, Brazilian Journal of Chemical Engineering, vol. 22, No. 01, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 1743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

Ying, J. Y. et al., Synthesis and Applications of Supramolecular-Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of the Royal Society of Chemistry, 2004, pp. 863-870.

Guo et al., Characterization of Beta/MCM-41 Composite Molecular Sieve Compared with the Mechanical Mixture Microporous and Mesoporous Materials, vols. 44-45; pp. 427-434.

Tao et al., ZSM-5 Monolith of Uniform Mesoporous Channels, Material Sciences, Chiba University, J. Am. Chem. Soc., Japan 2003, pp. 6044-6045.

* cited by examiner

ZEOLITE WITH TUNED ALUMINUM CONTENT AND MESOPOROSITY

RELATED APPLICATIONS

This application is a divisional patent application of U.S. patent application Ser. No. 14/983,901, entitled "METHODS FOR PREPARING ZEOLITES WITH SURFACTANT-TEMPLATED MESOPOROSITY AND TUNABLE ALUMINUM CONTENT, filed Dec. 30, 2015, now U.S. Pat. No. 10,626,019 which claims the priority benefit under 35 U.S.C. § 119(e) of U.S. Provisional Patent Application Ser. No. 62/098,157 entitled "METHODS FOR PREPARING ZEOLITES WITH SURFACTANT-TEMPLATED MESOPOROSITY AND TUNABLE ALUMINUM CONTENT," filed Dec. 30, 2014, the entire disclosure of which is incorporated herein by reference.

BACKGROUND

1. Field of the Invention

One or more embodiments of the invention relate to compositions and methods for preparing mesoporous zeolites from low Si/Al zeolites. More particularly, embodiments described herein relate to the preparation of mesoporous zeolites via a framework modification step followed by a mesopore introduction step.

2. Description of the Related Art

Previously, methods have been described for introducing mesoporosity into zeolites such as, for example, in U.S. Pat. No. 7,589,041. These zeolites, namely CBV 720 provided by Zeolyst International, have a high silicon-to-aluminum ratio ("Si/Al") and a low framework aluminum content. As previously described, this zeolite can be treated in the presence of a pore forming agent (e.g., a surfactant) at a controlled pH under a set of certain time and temperature conditions to introduce mesoporosity into the zeolite. Thereafter, the mesostructured material can be treated to remove the pore forming agent (e.g., by calcination or chemical extraction). Although advances have been made in the art of introducing mesoporosity into zeolites, improvements are still needed.

SUMMARY

One or more embodiments of the present invention concern a method for forming a mesoporous zeolite. Generally, the method comprises: (a) modifying an initial zeolite to thereby yield a lower SAR zeolite, wherein the lower SAR zeolite has a silica to alumina molar ratio that is at least 5 percent lower than the initial zeolite, but higher than the destabilizing SAR value of the initial zeolite; and (b) contacting at least a portion of the lower SAR zeolite with a pore forming agent to thereby form the mesoporous zeolite.

One or more embodiments of the present invention concern a method for forming a mesoporous zeolite. Generally, the method comprises: (a) providing a low SAR zeolite, wherein the low SAR zeolite is selected from the group consisting of a ZSM-5 having a silica to alumina molar ratio of 17 or less, a mordenite having a silica to alumina molar ratio of 10 or less, a faujasite having a silica to alumina molar ratio of 5 or less, a BEA zeolite having a silica to alumina molar ratio of 15 or less, a LTL zeolite having a silica to alumina molar ratio of 5 or less, an FRE zeolite having a silica to alumina molar ratio of 10 or less, and mixtures thereof; and (b) contacting at least a portion of the low SAR zeolite with a pore forming agent to thereby form the mesoporous zeolite.

One or more embodiments of the present invention concern a method for forming a mesoporous zeolite. Generally, the method comprises: (a) subjecting an initial zeolite to a framework modification process to thereby produce a framework-modified zeolite, wherein the framework-modified zeolite has a silica to alumina molar ratio that is lower than the initial zeolite; (b) contacting at least a portion of the framework-modified zeolite with an acid to thereby form an acid-treated zeolite; and (c) contacting at least a portion of the acid-treated zeolite with a pore forming agent to thereby form the mesoporous zeolite.

One or more embodiments of the present invention concern a low SAR zeolite, wherein the low SAR zeolite is selected from the group consisting of a ZSM-5 having a silica to alumina molar ratio of 17 or less, a mordenite having a silica to alumina molar ratio of 10 or less, a faujasite having a silica to alumina molar ratio of 5 or less, a BEA zeolite having a silica to alumina molar ratio of 15 or less, a LTL zeolite having a silica to alumina molar ratio of 5 or less, an FRE zeolite having a silica to alumina molar ratio of 10 or less, and mixtures thereof.

One or more embodiments of the present invention concern a mesoporous zeolite, wherein the mesoporous zeolite has a dV/log(d) in the range of 0.3 to 100 and a mesopore ratio in the range of 0.2 to 1.2.

BRIEF DESCRIPTION OF THE FIGURES

Embodiments of the present invention are described herein with reference to the following drawing figures, wherein.

DETAILED DESCRIPTION

Figure 1:
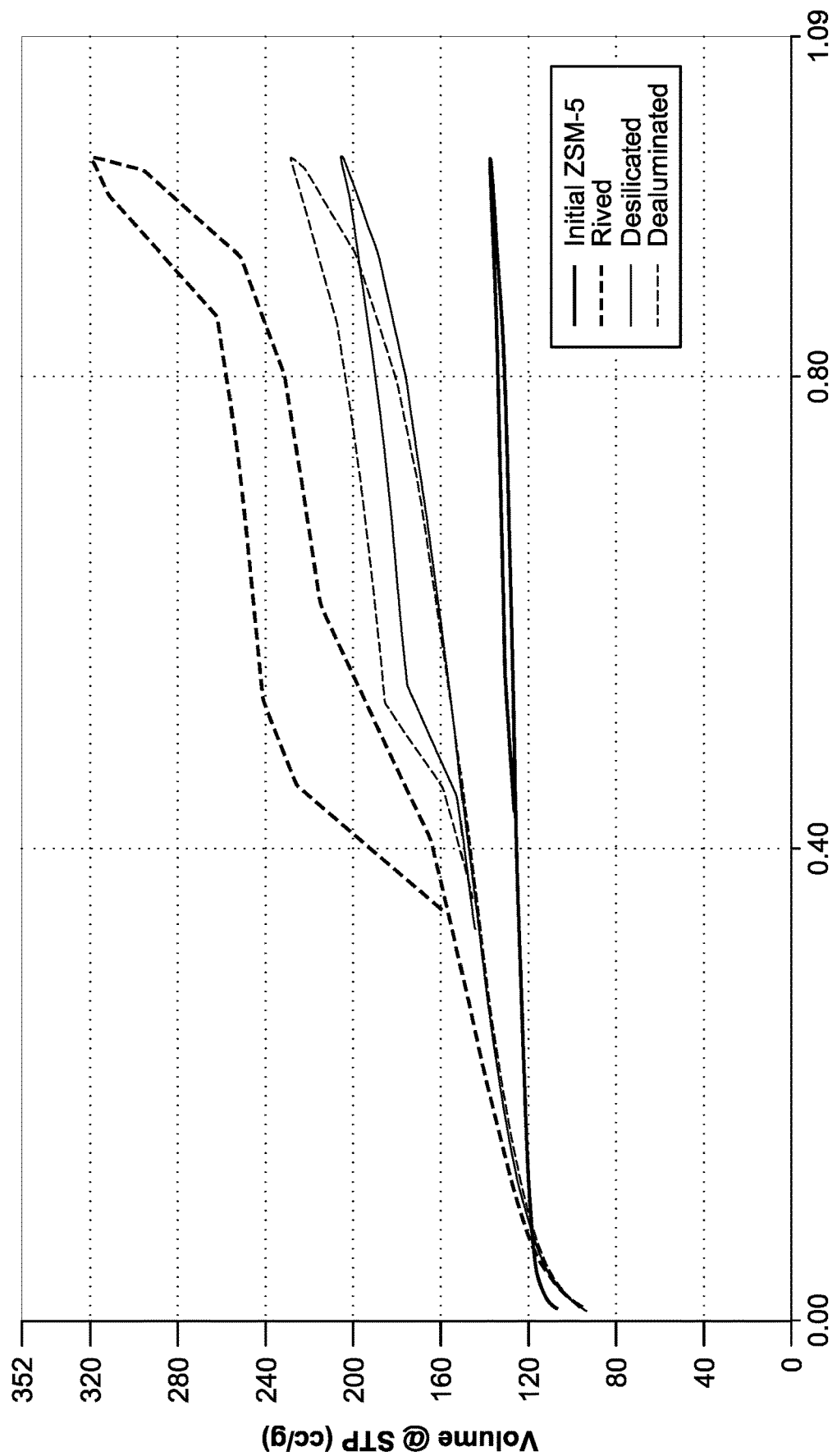
FIG. 1 depicts the Ar sorption isotherms of the treated zeolites in Example 4.

Generally, the process described herein enables the introduction of bi-modal mesoporosity into zeolites that were previously resistant to such treatments. In particular, in various embodiments, the process involves providing a zeolite having a low silica to alumina molar ratio (also referred to herein as "SAR") and subjecting this low SAR zeolite to further treatments to produce a mesoporous zeolite.

One advantage of the process described herein is that it can produce mesoporous zeolites with higher aluminum contents than were previously available and, in some cases, with higher aluminum contents than are achievable in the synthesis process. An additional benefit of the process described herein is that it can introduce bi-modal mesoporosity into the zeolite. As used herein, "bi-modal mesoporosity" refers to the introduction of desilicated large mesopores and surfactant-templated small mesopores into the zeolite.

In various embodiments, the low SAR zeolites used herein can be produced by directly synthesizing or crystallizing the low SAR zeolite, desilicating an initial zeolite, or aluminating an initial zeolite.

As used herein, a "low SAR zeolite" refers to a zeolite that has a silica to alumina molar ratio that is lower compared to conventional zeolites of the same species. For example, these low SAR zeolites can include, but are not limited to, ZSM-5, mordenite, faujasite, BEA zeolite, LTL zeolite, and/or FRE zeolite containing silica to alumina molar ratios that are lower when compared to commercially-available zeolites of the same species. It should be noted that the 3-letter names of the zeolites follow the IZA (International Zeolite Association) nomenclature.

In various embodiments, the low SAR zeolite can be a ZSM-5 having a silica to alumina molar ratio of at least 2, 3, or 4 and/or not more than 20, 19, 18, 17, 16, 15, 14, 13.5, or 13. Furthermore, in certain embodiments, the low SAR zeolite can be a ZSM-5 having a silica to alumina molar ratio in the range of 2 to 17, 2 to 16, 3 to 15, 3 to 14, 4 to 13.5, or 4 to 13. The silica to alumina molar ratios of the zeolites can be calculated from XRF analyses.

In various embodiments, the low SAR zeolite can be a mordenite having a silica to alumina molar ratio of at least 2, 3, or 4 and/or not more than 12, 11, 10, 9.5, 9, 8.5, or 8. Furthermore, in certain embodiments, the low SAR zeolite can be a mordenite having a silica to alumina molar ratio in the range of 2 to 10, 2 to 9.5, 3 to 9, 3 to 8.5, or 4 to 8.

In various embodiments, the low SAR zeolite can be a faujasite having a silica to alumina molar ratio of 2, 2.5, or 3 and/or not more than 5, 4.5, 4, or 3.5. Furthermore, in certain embodiments, the low SAR zeolite can be a faujasite having a silica to alumina molar ratio in the range of 2 to 5, 2 to 4.5, 2.5 to 4, or 3 to 4. In certain embodiments, the faujasite can comprise zeolite Y.

In various embodiments, the low SAR zeolite can be a BEA zeolite having a silica to alumina molar ratio of at least 2, 3, or 4 and/or not more than 15, 14, 13, or 12. Furthermore, in certain embodiments, the low SAR zeolite can be a BEA zeolite having a silica to alumina molar ratio in range of 2 to 15, 2 to 14, 3 to 13, or 4 to 12.

In various embodiments, the low SAR zeolite can be an LTL zeolite having a silica to alumina molar ratio of 2, 2.5, or 3 and/or not more than 5, 4.5, 4, or 3.5. Furthermore, in certain embodiments, the low SAR zeolite can be an LTL zeolite having a silica to alumina molar ratio in the range of 2 to 5, 2 to 4.5, 2.5 to 4, or 3 to 4.

In various embodiments, the low SAR zeolite can be an FRE zeolite having a silica to alumina molar ratio of at least 2, 3, or 4 and/or not more than 10, 9.5, 9, 8.5, or 8. Furthermore, in certain embodiments, the low SAR zeolite can be an FRE zeolite having a silica to alumina molar ratio in the range of 2 to 10, 2 to 9.5, 3 to 9, 3 to 8.5, or 4 to 8.

In one or more embodiments, the present invention is directed to a process that combines an initial treatment that increases the aluminum content of an initial zeolite (e.g., by desilication or alumination) and one or more subsequent treatment steps to impart mesoporosity in the aluminum-enriched zeolite. In various embodiments, this initial treatment can involve modifying an initial zeolite to thereby produce the low SAR zeolite. This modifying step can include a framework modification process such as, for example, a desilication step and/or an alumination step. One advantage of the modifying step described herein is that it can allow independent control of the aluminum content of the subsequently produced mesoporous zeolites.

The initial zeolite subjected to the modifying step can comprise a ZSM-5, a mordenite, a faujasite, a BEA zeolite, a LTL zeolite, an FRE zeolite, or combinations thereof. As used herein, "zeolite" can comprise any one of the zeolitic materials listed in the database of zeolite structures by the International Zeolite Association (IZA). In various embodiments, the initial zeolite can have a silica to alumina molar ratio that is less than 100, 75, 50, 40, 30, 20, 15, or 10 and more than 3, 4, 5, 6, or 7.

In one or more embodiments, the initial zeolite starting materials can have a total 20 to 80 Å diameter mesopore volume of less than 0.01 cc/g. Additionally, suitable initial zeolites can have a total 1 to 20 Å micropore volume of at least 0.3 cc/g. Furthermore, the initial zeolite can have an average unit cell size ("UCS") of at least 24.40, at least 24.45, or at least 24.50 Å. In certain embodiments, the initial zeolite has not been previously subjected to any forms of pretreatment including, for example, steam treatment, thermal treatment, dealumination, and/or desilication. Additionally, in various embodiments, the initial zeolite can be present as a component of a composite material. Such composite materials can further include, for example, one or more binder material components.

In various embodiments, the modifying step can comprise an alumination treatment. Generally, this alumination treatment can involve treating the initial zeolite with an aluminum source under proper conditions in order to produce the low SAR zeolite. In certain embodiments, this aluminum source can comprise sodium aluminate.

In various embodiments, the modifying step can comprise a desilication treatment. The conditions of the desilication process may vary depending on the type of zeolite subjected to treatment. In certain embodiments, this desilication step can involve treating the zeolite in a basic solution at an elevated temperature for an extended period of time. Generally, this basic desilication step can result in framework desilication.

The length of the desilication step, including the base treatment, can vary depending on the type of zeolite species used. For example, the desilication step can occur over a time period of 0.1 to 48 hours, 1 to 24 hours, or 4 to 16 hours. Similarly, the temperature of the desilication step can also vary depending on the type of zeolite treated during the process. For example, the desilication step, including the base treatment, can occur at a temperature in the range of 20 to 160° C., 40 to 140° C., or 60 to 120° C.

Likewise, the pH of the desilication step can vary depending on the type of zeolite treated in the process. For example, the base in the desilication treatment can have a pH of at least 8, in the range of from about 8 to about 14, in the range of from about 8 to about 12, or in the range of from about 9 to about 11. Any base suitable for providing a pH in the desired range may be employed. In various embodiments, the base can be selected from the group consisting of ammonium hydroxide, tetraalkyl ammonium hydroxides, sodium hydroxide, potassium hydroxide, sodium carbonate, potassium carbonate, amines, and mixtures of two or more thereof. In certain embodiments, the base comprises sodium hydroxide.

Consequently, the pH, temperature, and time parameters can be important for achieving the target silica to alumina molar ratio in the desilicated zeolite. For example, initial zeolites with higher silica to alumina molar ratios may require milder desilication conditions (e.g., milder pH, lower temperatures, and shorter time) compared to initial zeolites with lower silica to alumina molar ratios. Thus, varying the desilication conditions can allow greater access into the initial zeolites with lower silica to alumina molar ratios, which may not be accessible by direct synthesis.

Though not wishing to be bound by theory, it is believed that contacting the above-described initial zeolite with a base may cause at least partial desilication of the initial zeolite. Accordingly, in various embodiments, contacting the initial zeolite with a base may produce an at least partially desilicated zeolite. Furthermore, in certain embodiments, some desilication-based mesoporosity may be introduced into the zeolite during the desilication step.

In certain embodiments, the base treatment can increase the average unit cell size ("UCS") of the initial zeolite. For example, the low SAR zeolite can have a UCS that is at least 0.01, at least 0.02, at least 0.03, at least 0.04, at least 0.05, or at least 0.06 Å greater than the UCS of the initial zeolite.

In various embodiments, the desilication treatment decreases the zeolite surface area ("ZSA") and the Brunauer-Emmett-Teller ("BET") surface area of the initial zeolite, while increasing the matrix surface area ("MSA") of the initial zeolite. The BET surface area can be formulated by combining the ZSA and MSA of the zeolite. All surface areas are measured by applying BET theory and observing t-plot analysis of the gas sorption results.

For example, the low SAR zeolite can have a ZSA that is at least 10, 20, 30, 40, or 50 percent and/or not more than 200, 150, 125, 100, or 95 percent lower than the ZSA of the initial zeolite. In other embodiments, the low SAR zeolite can have a BET that is at least 10, 20, 30, 40, or 50 percent and/or not more than 200, 150, 125, 100, or 95 percent lower than the BET of the initial zeolite. Furthermore, in certain embodiments, the low SAR zeolite can have a MSA that is at least 10, 30, 50, 100, or 200 percent and/or not more than 1,000, 750, 500, 400, or 300 percent greater than the MSA of the initial zeolite.

In various embodiments, the aforementioned modifying step can yield a low SAR zeolite having a silica to alumina molar ratio that is lower than the silica to alumina molar ratio of the initial zeolite, but that is still higher than the destabilizing SAR value of the initial zeolite. As used herein, the "destabilizing SAR value" defines the SAR value at which the relative crystallinity of the modified zeolite drops to below 10 percent of the crystallinity of the initial zeolite as measured by X-ray diffraction ("XRD") or the SAR value below which another crystalline phase appears. In certain embodiments, the low SAR zeolite can have a silica to alumina molar ratio at which the relative crystallinity of the modified zeolite drops to below 15, 20, or 25 percent of the crystallinity of the initial zeolite as measured by XRD. As would be understood by one of ordinary skill in the art, the crystalline content of a zeolite can be measured by XRD and is typically expressed relative to the initial zeolite or another zeolite of the same structure as crystallinity standard. Thus, in various embodiments, the difference in crystalline content between the initial zeolite and the low SAR zeolite can be determined by XRD. Methods for determining the crystalline content of a zeolite are generally known to those of ordinary skill in the art.

Subsequent to the modifying step, the resulting low SAR zeolite can have a lower silica to alumina molar ratio compared to the initial zeolite. For example, the low SAR zeolite can have a silica to alumina molar ratio that is at least 5, 10, 15, 20, 25, 30, 35, or 40 and/or not more than 80, 75, 70, 65, or 60 percent lower than the initial zeolite. Furthermore, in certain embodiments, the low SAR zeolite can have a silica to alumina molar ratio that is lower than 25, 20, 18, 17, 16, 15, 14, 13, 12, 11, 10, 9, 8, 7, 6, 5, or 4.

Additionally or alternatively, the resulting low SAR zeolite can have a higher aluminum content compared to the initial zeolite. For example, the aluminum content of the low SAR zeolite can be at least 5, 10, 15, 20, 25, 30, 40, 50, 60, or 75 percent greater than the aluminum content of the initial zeolite.

In various embodiments, the low SAR zeolite can have a crystalline content that is less than the crystalline content of the initial zeolite as measured by XRD. In one or more embodiments, the modifying step can be sufficient to reduce the crystalline content of the initial zeolite by at least 1, 5, 10, 15, 20, 25, 30, 35, or 40 percent.

Accordingly, in one or more embodiments, the low SAR zeolite can have a crystalline content that is less than the crystalline content of the initial zeolite, such as, for example, at least 1, 5, 10, 15, 20, 25 30, 35, or 40 percent less than the crystalline content of the initial zeolite as measured by XRD. In further embodiments, the low SAR zeolite can have a reduced crystalline content that is within 50, 45, 40, 35, 30, 25, 20, 15, or 10 percent of the initial zeolite.

In various embodiments, the low SAR zeolite can have more mesopores than the initial zeolite. For example, the low SAR zeolite can have a total 20 to 80 Å diameter mesopore volume that is at least 5, 10, 20, 30, 40, 50, 60, 70, 80, 90, 100, 200, 300, 400, or 500 percent greater than the 20 to 80 Å diameter mesopore volume of the initial zeolite. Furthermore, the low SAR zeolite can have a total 20 to 80 Å diameter mesopore volume that is at least 0.002, 0.004, 0.005, 0.008, 0.01, 0.02, or 0.05 cc/g greater than the total 20 to 80 Å diameter mesopore volume of the initial zeolite.

In one or more embodiments, the low SAR zeolite can have a total 20 to 80 Å diameter mesopore volume of at least 0.01, 0.02, 0.03, 0.04, or 0.05 and/or not more than 0.3, 0.2, 0.15, 0.125, or 0.1 cc/g. Furthermore, in certain embodiments, the low SAR zeolite can have a total 20 to 80 Å diameter mesopore volume in the range of 0.01 to 0.3, 0.02 to 0.2, 0.03 to 0.15, 0.04 to 0.125, or 0.05 to 0.1 cc/g.

In one or more embodiments, the low SAR zeolite can have a total 20 to 300 Å diameter mesopore volume that is at least 5, 10, 20, 30, 40, 50, 60, 70, 80, 90, 100, 200, 300, 400, or 500 percent greater than the 20 to 300 Å diameter mesopore volume of the initial zeolite. Furthermore, the low SAR zeolite can have a total 20 to 300 Å diameter mesopore volume that is at least 0.01, 0.02, 0.03, 0.04, 0.05, 0.06, 0.07, or 0.1 cc/g greater than the total 20 to 300 Å diameter mesopore volume of the initial zeolite.

In one or more embodiments, the low SAR zeolite can have a total 20 to 300 Å diameter mesopore volume of at least 0.05, 0.06, 0.07, 0.08, 0.09, 0.10, 0.11, 0.12, 0.13, 0.14, or 0.15 cc/g. Additionally, the mesoporous zeolite can have a total 20 to 300 Å diameter mesopore volume in the range of from about 0.05 to about 0.70, in the range of from about 0.10 to about 0.60 cc/g, or in the range of from about 0.15 to about 0.50 cc/g.

In various embodiments, the low SAR zeolite can have a lower mesopore ratio than the initial zeolite. Based on one theory, the desilication process (if utilized as the modifying step) can introduce some amount of larger mesopores into the initial zeolite, thereby decreasing its mesopore ratio. As used herein, the "mesopore ratio" is defined as the pore volume of pores having a 20 to 80 Å diameter (as determined by NLDFT analysis) divided by the pore volume of pores having a 20 to 300 Å diameter (as determined by NLDFT analysis). For example, the low SAR zeolites can have a mesopore ratio that is at least 5, 10, 15, 20, 40, or 50 percent lower than the mesopore ratio of the initial zeolite. Additionally or alternatively, the low SAR zeolite can have a mesopore ratio that is at least 0.05, 0.1, 0.15, 0.2, or 0.25 lower than the mesopore ratio of the initial zeolite.

In alternative embodiments, the low SAR zeolite can have a greater mesopore ratio relative to the initial zeolite.

In one or more embodiments, the initial zeolite can have a mesopore ratio of at least 0.1, 0.2, 0.3, or 0.4 and/or not more than 0.9, 0.8, 0.7, or 0.6. Furthermore, in certain embodiments, the initial zeolite can have a mesopore ratio in the range of 0.1 to 0.9, 0.2 to 0.8, 0.3 to 0.7, or 0.4 to 0.6. In other embodiments, the low SAR zeolite can have a mesopore ratio of at least 0.1, 0.2, 0.1, 0.2, 0.3, or 0.4 and/or not more than 0.9, 0.8, 0.7, or 0.6. Moreover, in certain embodiments, the low SAR zeolite can have a mesopore ratio in the range of 0.1 to 0.9, 0.2 to 0.8, 0.3 to 0.7, or 0.4 to 0.6.

In various embodiments, the low SAR zeolite has a higher nPA-TPD relative to the initial zeolite. The "nPA-TPD" refers to the n-propylamine temperature programmed desorption. As would be appreciated by one skilled in the art, the nPA-TPD can indicate the Brønsted acidity of the zeolite sample. For example, the low SAR zeolite can have an nPA-TPD that is at least 5, 10, 15, or 20 percent and/or not more than 200, 100, 90, or 75 percent greater than the initial zeolite. Furthermore, in certain embodiments, the low SAR zeolite can have a nPA-TPD that is at least 5 to 200 percent, 10 to 100 percent, 15 to 90 percent, or 20 to 75 percent greater than the initial zeolite.

Subsequent to the modifying step, the resulting low SAR zeolite can be filtered, washed, and dried to yield a dried low SAR zeolite or can be subjected to other treatment after filtration and washing without drying. In one or more embodiments, following the modifying step, the low SAR zeolite can be vacuum filtered and washed with water. After the water wash, the low SAR zeolite can be filtered again. Any filtering and washing techniques known or hereafter discovered in the art may be employed for these steps.

In one or more embodiments, the optional drying step can include drying at a temperature in the range of from about 20 to about 150° C., in the range of from about 50 to about 120° C., or in the range of from 70 to 90° C. Furthermore, the drying step can be performed for a time period of at least 5 minutes, at least 30 minutes, or at least 1 hour. In other embodiments, the drying step can be performed for a time period in the range of from about 5 minutes to about 24 hours, in the range of from about 15 minutes to about 12 hours, or in the range of from 30 minutes to 2 hours.

In various embodiments, prior to introducing additional mesoporosity into the low SAR zeolite, the low SAR zeolite can be subjected to an acid treatment to thereby yield an acid-treated zeolite. In certain embodiments, the acid treatment can increase the silica to alumina molar ratio of the low SAR zeolite by removing aluminum therefrom. For example, the acid-treated zeolite can have a silica to alumina molar ratio that is at least 5, 10, 15, 20, 25, 30, 35, 40, 45, or 50 percent higher than the low SAR zeolite. Additionally or alternatively, the acid-treated zeolite can have a silica to alumina molar ratio that is not more than 300, 200, 150, 100, or 65 percent higher than the low SAR zeolite.

Generally, the acid treatment can involve contacting at least a portion of the low SAR zeolite with an acid. In one or more embodiments, the low SAR zeolite can be modified by exposing the low SAR zeolite in a solution containing an acid for a certain amount of time and temperature. The acid chosen can be any acid sufficient to produce an acid solution having a pH of less than 6, less than 4, less than 3, in the range of from about 1 to about 6, in the range of from about 2 to about 4, or in the range of from about 4 to about 6. The acid employed during the acid framework modification can be any known or hereafter discovered mineral acid, organic acid, or mixtures of two or more thereof. Furthermore, in various embodiments, the acid employed can also be a chelating agent.

Additionally, one or more complexing agents can be employed during the acid framework modification. In various embodiments, the acid selected for use herein can be a dealuminating acid. Specific examples of acids suitable for use in the various embodiments described herein include, but are not limited to, hydrochloric acid, sulfuric acid, nitric acid, acetic acid, sulfonic acid, oxalic acid, citric acid, ethylenediaminetetraacetic acid ("EDTA"), tartaric acid, malic acid, glutaric acid, succinic acid, and mixtures of two or more thereof. In certain embodiments, the acid is not hydrofluoric acid.

In one or more embodiments, a buffer solution can be employed during the acid framework modification that uses a weak acid in combination with a weak acid salt to give a constant pH. For example, in one embodiment, citric acid can be used with ammonium citrate to produce a constant pH, while other weak acids and weak acid salts can also be used.

During the acid framework modification, the acid can be present in an amount in the range of from about 1 to about 10, or in the range of from 1.5 to 4 milliequivalents per gram of lower SAR zeolite ("meq/g"). In further embodiments of the acid framework modification, the acid can be present in an amount of at least about 1.5, 2.0, 2.5, 3.0, 3.5, 4.0, or 4.5 and/or not more than 10, 9, 8.5, 8, 7.5, 7, 6.5, or 6 meq/g.

In certain embodiments, the concentration of the acid used for the acid framework modification can influence the subsequent mesopore volumes and sizes in the acid-modified zeolites. In such embodiments, the increase of acid severity used in the acid framework modification can be correlated with the increasing mesopore volumes and pore-size-distribution ("POSD"). Furthermore, the acid framework modification can be performed at a temperature in the range of from about 20 to about 200° C., or in the range of from room temperature to about 100° C. Moreover, the acid framework modification can be performed over a time period ranging from about 1 minute to about 12 hours, in the range of from about 1 minute to about 4 hours, or in the range of from 30 minutes to 2 hours. In one or more embodiments, the initial zeolite is not steamed prior to acid framework modification.

In one or more embodiments, following the acid framework modification, the framework-modified zeolite can be vacuum filtered and washed with water. Any filtering and washing techniques known or hereafter discovered in the art may be employed for these steps.

In one or more embodiments, the optional drying step can include drying at a temperature of at least 20° C., at least 50° C., or at least 80° C. Additionally, the drying step can be performed at a temperature in the range of from about 20 to about 150° C., in the range of from about 50 to about 120° C., or in the range of from 70 to 90° C. Furthermore the drying step can be performed for a time period of at least 5 minutes, at least 30 minutes, or at least 1 hour. In other embodiments, the drying step can be performed for a time period in the range of from about 5 minutes to about 24 hours, in the range of from about 15 minutes to about 12 hours, or in the range of from 30 minutes to 2 hours.

In still other embodiments, the drying step can be omitted entirely. In other words, after filtering the acid-treated framework-modified zeolite, the resulting wet cake can be directly subjected to the below-described mesopore formation process.

In various embodiments, the acid-treated zeolite can have a crystalline content that is less than the crystalline content of the low SAR zeolite as measured by XRD. In one or more embodiments, the acid treatment process can be sufficient to reduce the crystalline content of the low SAR zeolite by at least 1, 2, 3, 4, 5, or 10 percent as measured by XRD. In further embodiments, the acid-treated zeolite can have a reduced crystalline content that is within 50, 45, 40, 35, 30, 25, 20, 15, or 10 percent of the initial zeolite.

In certain embodiments, the acid treatment process can decrease the average UCS of the low SAR zeolite. For example, the acid-treated zeolite can have a UCS that is at least 0.01, 0.02, 0.03, 0.04, 0.05, or 0.06 lower than the UCS of the low SAR zeolite.

In various embodiments, the acid treatment increases the zeolite surface area ("ZSA"), the matrix surface area ("MSA"), and the Brunauer-Emmett-Teller ("BET") surface area of the low SAR zeolite. For example, the low SAR zeolite can have a ZSA, MSA, and/or BET that is at least 10, 25, 50, 100, or 150 percent and/or not more than 500, 400, 300, 250, or 200 percent lower than the ZSA, MSA, and/or BET of the acid-treated zeolite. Furthermore, in certain embodiments, the low SAR zeolite can have a ZSA, MSA, and/or BET that is 10 to 500 percent, 25 to 400 percent, 50 to 300 percent, 100 to 250 percent, or 150 to 200 percent lower than the ZSA, MSA, and/or BET of the acid-treated zeolite.

As mentioned above, the framework-modified zeolite (e.g., low SAR zeolite or acid-treated zeolite) can be subjected to a mesopore formation process in order to form at least one mesopore in the framework-modified zeolite. Methods for mesopore incorporation contemplated by various embodiments of the present invention (e.g., introduction of mesoporosity in zeolites) can generally include the following steps:

1. Contacting the framework-modified zeolite with a pH controlling medium, optionally in the presence of a pore forming agent, under various time and temperature conditions.
2. Filtering, washing, and drying the zeolite.
3. Removing and/or recovering the pore forming agent (if present), for example, by calcination (removal) and/or chemical extraction (recovery).
4. The resulting material can also be chemically modified (e.g., by ion exchange with rare earths); blended with binders, matrix, and additives; and shaped (e.g., into beads, pellets, and FCC microspheres).

In one or more embodiments, the mesopore formation process can be performed employing any reagents and under any conditions described in U.S. Pat. No. 7,589,041, the entire disclosure of which is incorporated herein by reference. For example, the temperature employed during mesopore formation can range from about room temperature to about 200° C. The time period employed can be in the range of from about 2 hours (or less) to about 2 weeks.

In one or more embodiments, the mesopore formation process at least comprises contacting the above-described framework-modified zeolite with a base. In various embodiments, the above-mentioned pH controlling medium can have a pH of at least 7, in the range of from about 8 to about 14, in the range of from about 8 to about 12, or in the range of from about 9 to about 11. Any base suitable for providing a pH in the desired range may be employed. In various embodiments, the base can be selected from the group consisting of ammonium hydroxide, tetraalkyl ammonium hydroxides, sodium hydroxide, potassium hydroxide, sodium carbonate, potassium carbonate, amines, and mixtures of two or more thereof. In certain embodiments, the base comprises a mixture of ammonium hydroxide and sodium hydroxide.

As noted above, a pore forming agent may optionally be employed along with the pH controlling medium. In one or more embodiments, the pore forming agent can include a surfactant. When basic conditions are employed, typically a cationic surfactant can be used. In one or more embodiments, the surfactant employed can comprise one or more alkyltrimethylammonium salts and/or one or more dialkyldimethylammonium salts. In various embodiments, the surfactant can be selected from the group consisting of cetyltrimethyl ammonium bromide ("CTAB"), cetyltrimethyl ammonium chloride ("CTAC"), behenyltrimethylammonium chloride ("BTAC"), and mixtures thereof. Other suitable pore forming agents include, but are not limited to, non-ionic surfactants, polymers (e.g., block copolymers), and soft templates.

In alternate embodiments, the mesopore introduction process can be performed in the absence or substantial absence of a pore forming agent. Thus, in various embodiments, the mesopore introduction process can be performed in the absence or substantial absence of a surfactant. Similarly, the mesopore introduction process can be performed in the absence or substantial absence of any cationic surfactants, non-ionic surfactants, polymers (e.g., block copolymers), and soft templates.

In various embodiments, following contact with the pH controlled medium, the zeolite can be subjected to thermal treatment. In various embodiments, such thermal treatment can include contacting at least a portion of the zeolite with steam. In one or more embodiments, the zeolite can be contacted with steam having a temperature of at least 450° C., at least 550° C., at least 650° C., or at least 700° C. Additionally, following contact with the pH controlled medium, the zeolite can be contacted with steam having a temperature in the range of from about 450 to about 1,000° C., in the range of from about 500 to about 950° C., in the range of from about 650 to about 950° C., in the range of from about 700 to about 850° C., or about 788° C. Thermal treatment can be performed for a time period ranging from about 1 minute to about 24 hours, about 5 minutes to about 12 hours, or about 10 minutes to about 8 hours.

Following the pH controlled medium contacting step, the zeolite can be filtered, washed, and/or dried. In one or more embodiments, the zeolite can be filtered via vacuum filtration and washed with water. Thereafter, the recovered zeolite can optionally be filtered again and optionally dried.

Following the filter, wash, and drying steps, the zeolite can be subjected to additional heat treatment or chemical extraction in order to remove or recover at least a portion of the pore forming agent, if employed. In one or more embodiments, the zeolite can be calcined in nitrogen at a temperature in the range of from about 500 to about 600° C., and then in air for pore forming agent (e.g., surfactant) removal. The pore forming agent removal technique is selected based, for example, on the time needed to remove all of the pore forming agent from the zeolite. The total time period employed for heat treatment of the zeolite can be in the range of from about 30 minutes to about 24 hours, or in the range of from 1 to 12 hours. In various embodiments, this can include subjecting the mesoporous zeolite to ammonium exchange, azeotropic distillation, calcination, or a combination thereof.

In various embodiments, the resulting mesoporous zeolite can be subjected to one or more post-formation treatments. Suitable post-formation treatments are described, for example, in U.S. Pat. No. 7,589,041, which, as noted above, is incorporated herein by reference in its entirety. In various embodiments, the mesoporous zeolite can be subjected to one or more post-formation treatments selected from the group consisting of calcination, ion exchange, steaming, incorporation into an adsorbent, incorporation into a catalyst, silicon incorporation, incorporation into a membrane, and combinations of two or more thereof. Suitable ion exchange procedures for the resulting mesoporous zeolite include, but are not limited to, ammonium ion exchange, rare earth ion exchange, lithium ion exchange, potassium ion exchange, calcium ion exchange, and combinations of two or more thereof.

In various embodiments, the resulting mesoporous zeolite can be a mesostructured zeolite.

Accordingly, in various embodiments, the mesoporous zeolite can have a silica to alumina molar ratio that is at least 5, 10, 15, 20, 25, 30, 35, 40, 45, or 50 percent higher than the low SAR zeolite. Additionally or alternatively, the mesoporous zeolite can have a silica to alumina molar ratio that is not more than 300, 200, 150, 100, 65, or 50 percent higher than the low SAR zeolite.

Furthermore, in various embodiments, the resulting mesoporous zeolite can have a crystalline content that is at least 1, 5, 10, 15, 20, 25, 30, 35, or 40 percent greater than the framework-modified zeolite (e.g., the low SAR zeolite or acid-treated zeolite). Furthermore, the resulting mesoporous zeolite can have a crystalline content that is at least 60, 65, 70, 75, 80, 85, 90, 95, or 99 percent of the crystalline content of the above-described initial zeolite, as measured by XRD. In further embodiments, the mesoporous zeolite can have a crystalline content of at least 20, 25, 30, 35, 40, 45, 50, 55, 60, 65, 70, 75, 80, 85, 90, 95, or 99 weight percent, as measured by XRD.

In various embodiments, the resulting mesoporous zeolite can have a total 20 to 80 Å diameter mesopore volume that is at least 5, 10, 20, 30, 40, 50, 60, 70, 80, 90, 100, 200, 300, 400, or 500 percent greater than the 20 to 80 Å diameter mesopore volume of the above-described initial zeolite, low SAR zeolite, or acid-treated zeolite. Furthermore, the mesoporous zeolite can have a total 20 to 80 Å diameter mesopore volume that is at least 0.02, 0.04, 0.05, 0.06, 0.07, 0.08, 0.09, 0.1, or 0.2 cc/g greater than the total 20 to 80 Å diameter mesopore volume of the initial zeolite, low SAR zeolite, or acid-treated zeolite.

In various embodiments, the mesoporous zeolite can have a total 20 to 80 Å diameter mesopore volume of at least 0.05, 0.06, 0.07, 0.08, 0.09, 0.10, 0.11, 0.12, 0.13, 0.14, 0.15, 0.20, or 0.25 cc/g. Additionally, the mesoporous zeolite can have a total 20 to 80 Å diameter mesopore volume in the range of from about 0.05 to about 0.70, in the range of from about 0.10 to about 0.60 cc/g, or in the range of from about 0.15 to about 0.50 cc/g.

In various embodiments, the resulting mesoporous zeolite can have a total 20 to 300 Å diameter mesopore volume that is at least 5, 10, 20, 30, 40, 50, 60, 70, 80, 90, 100, 200, 300, 400, or 500 percent greater than the 20 to 300 Å diameter mesopore volume of the above-described initial zeolite, low SAR zeolite, or acid-treated zeolite. Furthermore, the mesoporous zeolite can have a total 20 to 300 Å diameter mesopore volume that is at least 0.02, 0.04, 0.05, 0.06, 0.07, 0.08, 0.09, 0.1, or at least 0.2 cc/g greater than the total 20 to 300 Å diameter mesopore volume of the initial zeolite, low SAR zeolite, or acid-treated zeolite.

In various embodiments, the mesoporous zeolite can have a total 20 to 300 Å diameter mesopore volume of at least 0.05, 0.06, 0.07, 0.08, 0.09, 0.10, 0.11, 0.12, 0.13, 0.14, 0.15, 0.20, or 0.25 cc/g. Additionally, the mesoporous zeolite can have a total 20 to 300 Å diameter mesopore volume in the range of from about 0.05 to about 0.70, in the range of from about 0.10 to about 0.60 cc/g, or in the range of from about 0.15 to about 0.50 cc/g.

Due to the desilication treatment discussed above, at least two types of mesopores can be introduced into the mesoporous zeolite: (1) desilicated mesopores that have broad pore size distribution and (2) rived mesopores with much narrower pore size distribution. This phenomena can be demonstrated by the NLDFT differential mesopore size distribution, which can be shown by the dV/log(D) values and/or the dV/D value of the zeolite. As used herein, "dV" is the first derivative of pore volume and "D" is the pore diameter in angstrom. For example, the mesoporous zeolite can have a dV/log(D) of at least 0.3, 0.35, 0.4, 0.45, 0.75, 1, 1.5, 2, or 2.5 and/or not more than 100, 10, 9.5, 9, 8.5, 8, 7.5, 7, or 6.5. Moreover, in certain embodiments, the mesoporous zeolite can have a dV/log(D) value in the range of 0.3 to 10, 0.35 to 9.5, 0.4 to 9, 0.45 to 8.5, 0.75 to 8, 1 to 7.5, 1.5 to 7, 2 to 6.5, or 2.5 to 6.5. Similarly, in various embodiments, the mesoporous zeolite can have a dV/D of at least 0.002, 0.0035, 0.004, 0.0045, 0.0075, 0.01, 0.015, 0.02, or 0.025 and/or not more than 0.1, 0.095, 0.09, 0.085, 0.08, 0.075, 0.07, or 0.065. Furthermore, in certain embodiments, the mesoporous zeolite can have a dV/D in the range of 0.002 to 0.1, 0.0035 to 0.95, 0.0035 to 0.09, 0.004 to 0.08, 0.0045 to 0.08, 0.0075 to 0.075, 0.01 to 0.07, 0.015 to 0.07, 0.02 to 0.065, or 0.025 to 0.65.

Furthermore, in certain embodiments, the mesoporous zeolite can demonstrate an inflection in an Ar adsorption isotherm at 87 K between a P/P0 at 0.1 to 0.99.

Additionally, in various embodiments, the mesoporous zeolite can have a mesopore ratio that is greater than the initial zeolite, low SAR zeolite, and/or acid-treated zeolite. For example, the mesoporous zeolite can have a mesopore ratio that is at least 5, 10, 25, 50, 100, or 200 percent greater than the mesopore ratio of the initial zeolite, low SAR zeolite, and/or acid-treated zeolite. Moreover, in certain embodiments, the mesoporous zeolite can have a mesopore ratio that is at least 0.05, 0.1, 0.15, 0.2, or 0.25 greater than the mesopore ratio of the initial zeolite, low SAR zeolite, and/or acid-treated zeolite.

In other embodiments, the mesoporous zeolite can have a mesopore ratio of at least 0.2, 0.3, 0.4, 0.5, 0.6, or 0.7 and/or not more than 1.2, 1, 0.95, or 0.9. Moreover, in certain embodiments, the mesoporous zeolite can have a mesopore ratio in the range of 0.2 to 1.2, 0.3 to 1, 0.3 to 1, 0.4 to 0.95, 0.5 to 0.9, 0.6 to 0.9, or 0.7 to 0.9.

Furthermore, in various embodiments, the mesoporous zeolite has a lower nPA-TPD relative to the initial zeolite. For example, the mesoporous zeolite can have an nPA-TPD that is at least 10, 20, 30, or 40 percent and/or not more than 200, 100, 90, or 75 percent lower than the initial zeolite. Furthermore, in certain embodiments, the mesoporous zeolite can have an nPA-TPD that is 10 to 200 percent, 20 to 100 percent, 30 to 90 percent, or 40 to 75 percent lower than the initial zeolite.

In various embodiments, the mesoporous zeolite has a lower ZSA relative to the acid-treated zeolite. For example, the mesoporous can have a ZSA that is at least 10, 25, 50, 100, or 150 percent and/or not more than 500, 400, 300, 250, or 200 percent lower than the ZSA of the acid-treated zeolite.

In other embodiments, the mesoporous zeolite has a MSA and BET surface area that is greater than the acid-treated zeolite. For example, the mesoporous zeolite can have a BET that is at least 10, 20, 30, 40, or 50 percent and/or not more than 200, 150, 125, 100, or 95 percent greater than the BET of the acid-treated zeolite. Furthermore, in certain embodiments, the mesoporous zeolite can have a MSA that is at least 10, 30, 50, 100, or 200 percent and/or not more than 1,000, 750, 500, 400, or 300 percent greater than the MSA of the acid-treated zeolite.

In certain embodiments, the mesoporous zeolite can have a lower UCS relative to the initial zeolite. For example, the mesoporous zeolite can have a UCS that is at least 0.01, 0.02, 0.04, 0.06, 0.08, or 0.10 less than the UCS of the initial zeolite.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

This invention can be further illustrated by the following examples of embodiments thereof, although it will be understood that these examples are included merely for the purposes of illustration and are not intended to limit the scope of the invention unless otherwise specifically indicated.

EXAMPLES

Examples 1-3

Samples of ZSM-5 (CBV2314 from Zeolyst International), mordenite (CV10A from Zeolyst International), and NaY zeolite (provided by W. R. Grace) were subjected to desilication pretreatments under varying reaction conditions. Various properties of these zeolites are depicted in Table 1, below.

In the first study, 227 g of ZSM-5 (CBV2314) was heated with 128 g of 50% NaOH in 800 g of deoionized water at 80° C. for 1 hour. The resulting mixture was filtered and washed to yield a desilicated zeolite labeled as "DS-1" in Table 1, which had a crystallinity of 67% (relative to the initial ZSM-5).

Next, 22.7 g of ZSM-5 (CBV2314) was heated with 19.2 g of 50% NaOH in 80 g of deoionized water at 80° C. for 1 hour. The resulting mixture was filtered and washed to yield a desilicated zeolite labeled as "DS-2" in Table 1, which had a crystallinity of 37% (relative to the initial ZSM-5).

In the second study, 58 g of mordenite (CBV10A) was heated with 24 g of 50% NaOH in 128 g of deoionized water at 80° C. for 1 hour. The resulting mixture was filtered and washed to yield a desilicated zeolite labeled as "DS-1" in Table 1, which had a crystallinity of 86% (relative to the initial mordenite).

Next, 58 g of mordenite (CBV10A) was heated with 24 g of 50% NaOH in 128 g of deoionized water at 80° C. for 24 hours. The resulting mixture was filtered and washed to yield a desilicated zeolite labeled as "DS-2" in Table 1, which had a crystallinity of 63% (relative to the initial mordenite).

In the third study, 205 g of NaY zeolite was heated with 72 g of 50% NaOH in 600 g of deoionized water at 80° C. for 1 hour. The resulting mixture was filtered and washed to yield a desilicated zeolite labeled as "DS-1" in Table 1, which had a crystallinity of 97% (relative to the initial NaY zeolite).

Next, 205 g of NaY zeolite was heated with 144 g of 50% NaOH in 600 g of deoionized water at 80° C. for 1 hour. The resulting mixture was filtered and washed to yield a desilicated zeolite labeled as "DS-2" in Table 1, which had a crystallinity of 93% (relative to the initial NaY zeolite).

Table 1, below, depicts the properties of the desilicated zeolites compared to the starting initial zeolites. It should be noted that "PV" in Table 1 signifies "pore volume" and that "Meso Ratio" represents the above-described mesopore ratio. Argon sorption was used to characterize the porosity of the zeolites. The starting initial zeolites were used as the crystallinity standard. BET surface area was calculated from the Ar sorption results. ZSA and MSA were calculated using t-plot method also from the Ar sorption results. All pore volumes (0-20 Å, 20-80 Å, and 20-300 Å, all in cc/g) were calculated using the NLDFT module in the QuadraWin program provided by Quantachrome Instruments from the Ar sorption results.

TABLE 1

| Sample | XRD % | UCS (Å) | SAR | 0-20 Å cc/g | 20-80 Å cc/g | 20-300 Å cc/g | Meso Ratio | dV/log(D) | ZSA m²/g | MSA m²/g | BET m²/g |
|---|---|---|---|---|---|---|---|---|---|---|---|
| ZSM-5 | 100 | N/A | 24.1 | 0.20 | 0.01 | 0.02 | 0.55 | 0.04 | 389 | 39 | 428 |
| DS-1 | 67 | N/A | 14.6 | 0.12 | 0.05 | 0.15 | 0.35 | 0.32 | 204 | 107 | 311 |
| DS-2 | 37 | N/A | 9.7 | 0.09 | 0.07 | 0.15 | 0.45 | 0.24 | 126 | 141 | 267 |
| Mordenite | 100 | N/A | 13.2 | 0.16 | 0.01 | 0.02 | 0.63 | 0.03 | 302 | 32 | 334 |
| DS-1 | 86 | N/A | 11.2 | 0.11 | 0.05 | 0.08 | 0.56 | 0.16 | 184 | 135 | 319 |
| DS-2 | 63 | N/A | 8.1 | 0.09 | 0.03 | 0.08 | 0.41 | 0.15 | 149 | 82 | 231 |
| NaY | 100 | 24.65 | 5.6 | 0.36 | 0.01 | 0.02 | 0.39 | 0.05 | 832 | 25 | 857 |
| DS-1 | 97 | 24.68 | 4.9 | 0.31 | 0.00 | 0.02 | 0.21 | 0.17 | 731 | 26 | 757 |
| DS-2 | 93 | 24.74 | 4.1 | 0.30 | 0.00 | 0.02 | 0.22 | 0.23 | 734 | 29 | 763 |

As shown in Table 1, the desilication pretreatments introduced some mesoporosity in the zeolites.

Example 4

In this study, ZSM-5 (CBV2314 from Zeolyst International) was treated with 8 mmol/g NaOH solution at 80° C. for 1 hour, as described in Example 1, which was then filtered and washed. The resulting product still had a ZSM-5 structure as confirmed by XRD, but the SAR was reduced to about 15. Also, it was observed that some mesoporosity was introduced during the desilication step. The product was then treated in sulfuric acid (2M, 12 cc/g zeolite) to dealuminate the zeolite to a SAR of about 37. The dealuminated zeolite was then treated with CTAC (0.5 g/g zeolite) and NaOH (0.5 mmol/g zeolite) at ~20% solid content. The product ("Rived") was then ammonium exchanged and calcined to remove surfactant templates.

dealuminated zeolites had 3 SAR values at ~24, 32, and 35, respectively (see Table 3, below). Treatment of the dealuminated zeolites (labeled "A1," "A2," and "A3" in Table 2) with CTAC (0.5 g/g) in NaOH solution (0.75 mmol/g) at 80° C. for 1 hour yielded three mesostructured zeolites (i.e., "rived" zeolites), the properties of which are listed in Table 3.

Argon sorption was used to characterize the porosity of the zeolites in Table 3. It should be noted that Rived Samples 1, 2, and 3, as shown in Table 3, all contained inflections in their Ar adsorption isotherms at 87 K between a P/P0 at 0.1 to 0.99. The starting initial zeolites were used as the crystallinity standard. BET surface area was calculated from the Ar sorption results. ZSA and MSA were calculated using t-plot method also from the Ar sorption results. All pore volumes (0-20 Å, 20-80 Å, and 20-300 Å, all in cc/g) were calculated using the NLDFT module in the QuadraWin program provided by Quantachrome Instruments from the Ar sorption results.

TABLE 3

| Sample | XRID % | SAR | 0-20 Å cc/g | 20-80 Å cc/g | 20-300 Å cc/g | Meso Ratio | dV/log(D) | ZSA m²/g | MSA m²/g | BET m²/g |
|---|---|---|---|---|---|---|---|---|---|---|
| Desilicated CBV2314 | 54 | 13.5 | 0.09 | 0.04 | 0.13 | 0.34 | 0.25 | 137 | 93 | 229 |
| A1 (0.3M) | 55 | 24.3 | 0.17 | 0.07 | 0.17 | 0.38 | 0.37 | 277 | 165 | 442 |
| Rived-1 | 67 | 24.1 | 0.15 | 0.21 | 0.23 | 0.90 | 1.42 | 168 | 320 | 487 |
| A2 (0.45M) | 52 | 32.9 | 0.17 | 0.07 | 0.16 | 0.42 | 0.24 | 284 | 162 | 445 |
| Rived-2 | 67 | 31.7 | 0.14 | 0.22 | 0.29 | 0.75 | 2.31 | 136 | 343 | 478 |
| A3 (0.6M) | 51 | 35.1 | 0.16 | 0.06 | 0.17 | 0.38 | 0.27 | 263 | 159 | 422 |
| Rived-3 | 67 | 35.2 | 0.13 | 0.26 | 0.31 | 0.84 | 2.99 | 97 | 384 | 481 |

Figure 2:
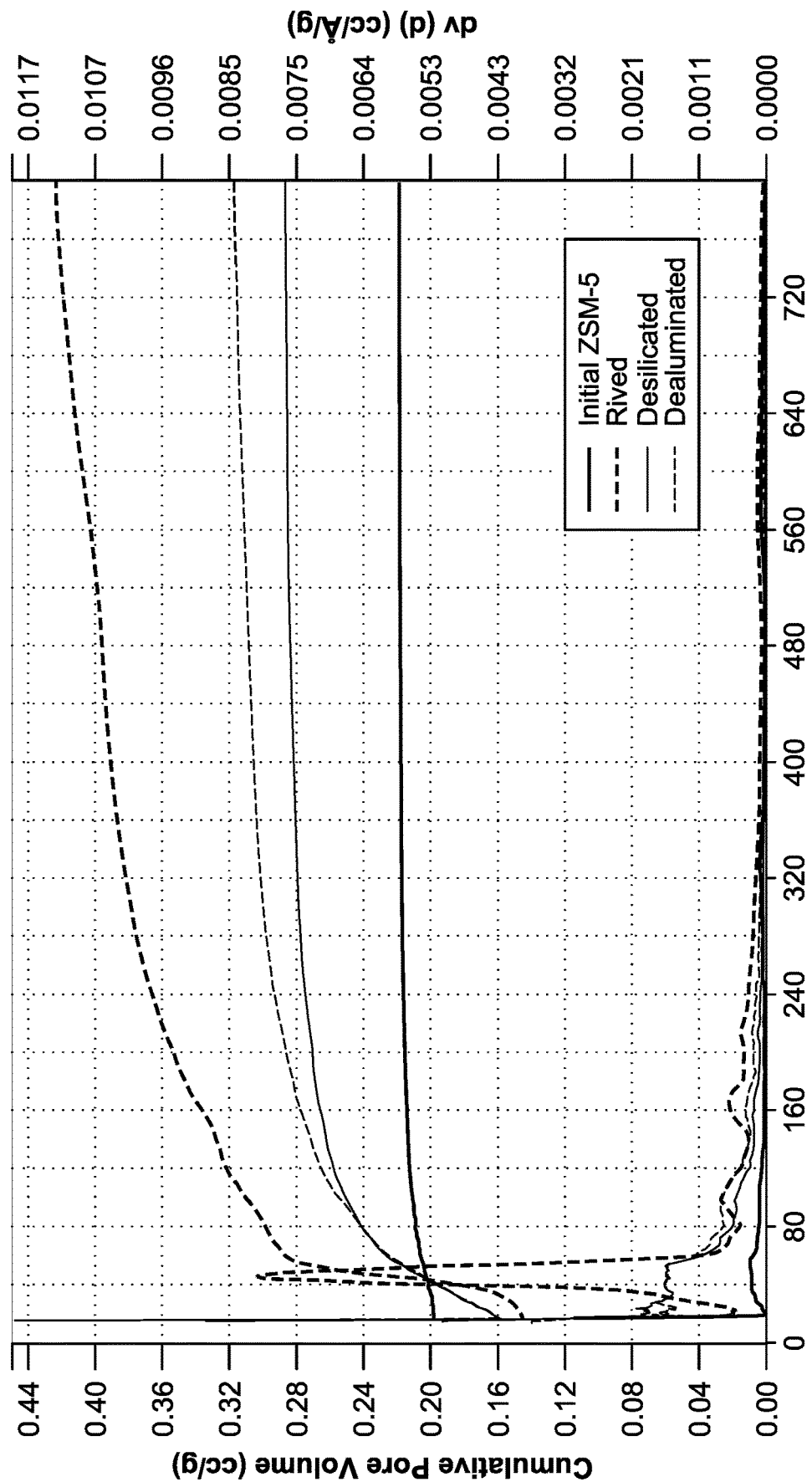
FIG. 2 depicts NLDFT (non-local density function theory) pore size distributions of the treated zeolites in Example 4.

FIG. 1 depicts the Ar sorption isotherms of the starting ZSM-5, NaOH-desilicated zeolite, $H_2SO_4$-dealuminated zeolite, and the mesoporous final product. The corresponding properties of the zeolites are listed in Table 2. FIG. 2 depicts the NLDFT pore size distributions of the treated zeolites. It should be noted that the mesopore ratio ("Meso Ratio"), as depicted in Table 2, was measured after subjecting the zeolite to ammonium exchange. It should also be noted that the rived sample (i.e., mesoporous sample) contained an inflection in an Ar adsorption isotherm at 87 K between a P/P0 at 0.1 to 0.99.

As shown in Table 2, argon sorption was used to characterize the porosity of the zeolites. The starting initial zeolites were used as the crystallinity standard. All pore volumes (0-20 Å, 20-80 Å, and 20-300 Å, all in cc/g) were calculated using the NLDFT module in the QuadraWin program provided by Quantachrome Instruments from the Ar sorption results.

Example 6

Figure 3:
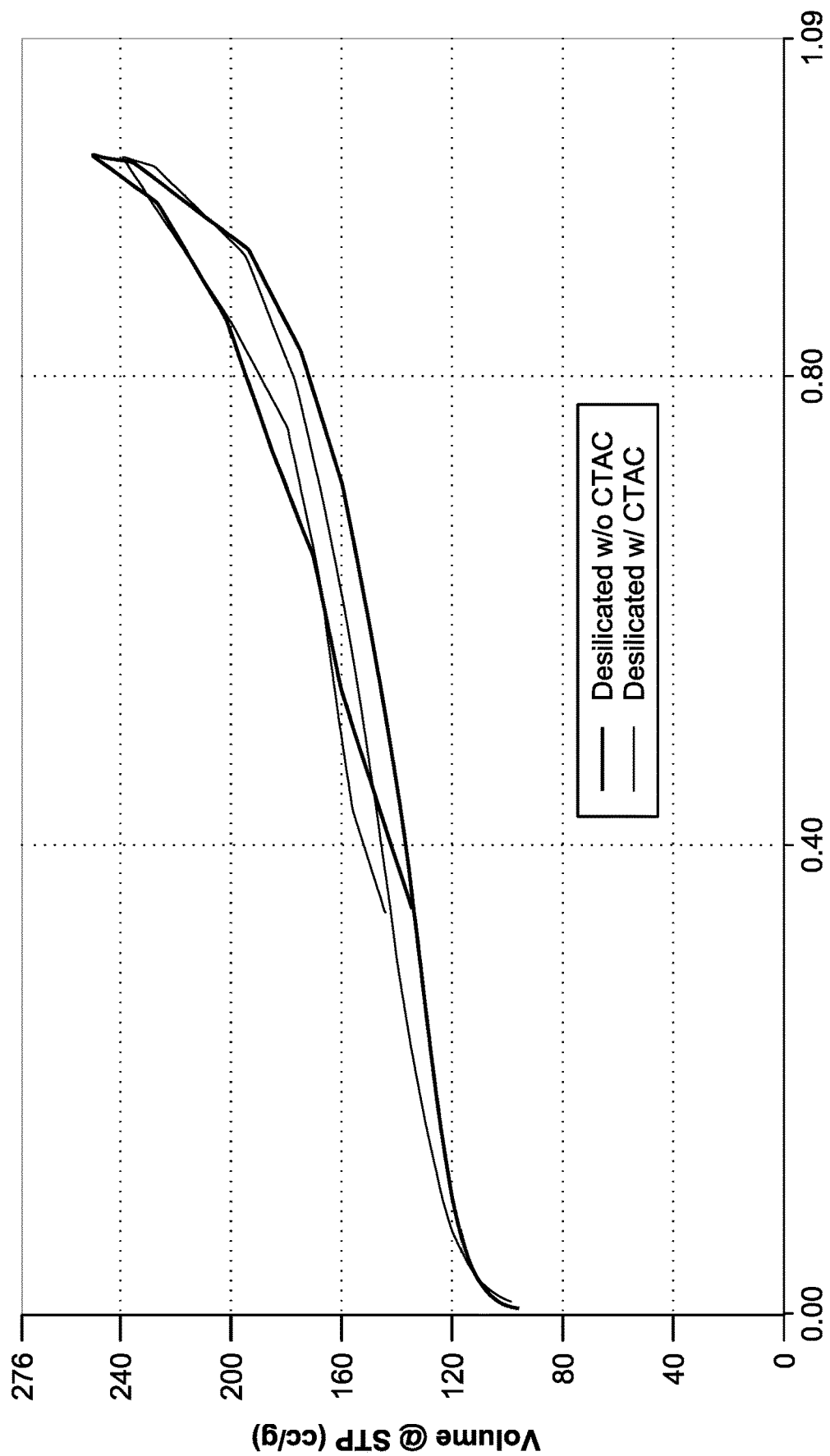
FIG. 3 depicts the Ar sorption isotherms of the treated zeolites in Example 6.
Figure 4:
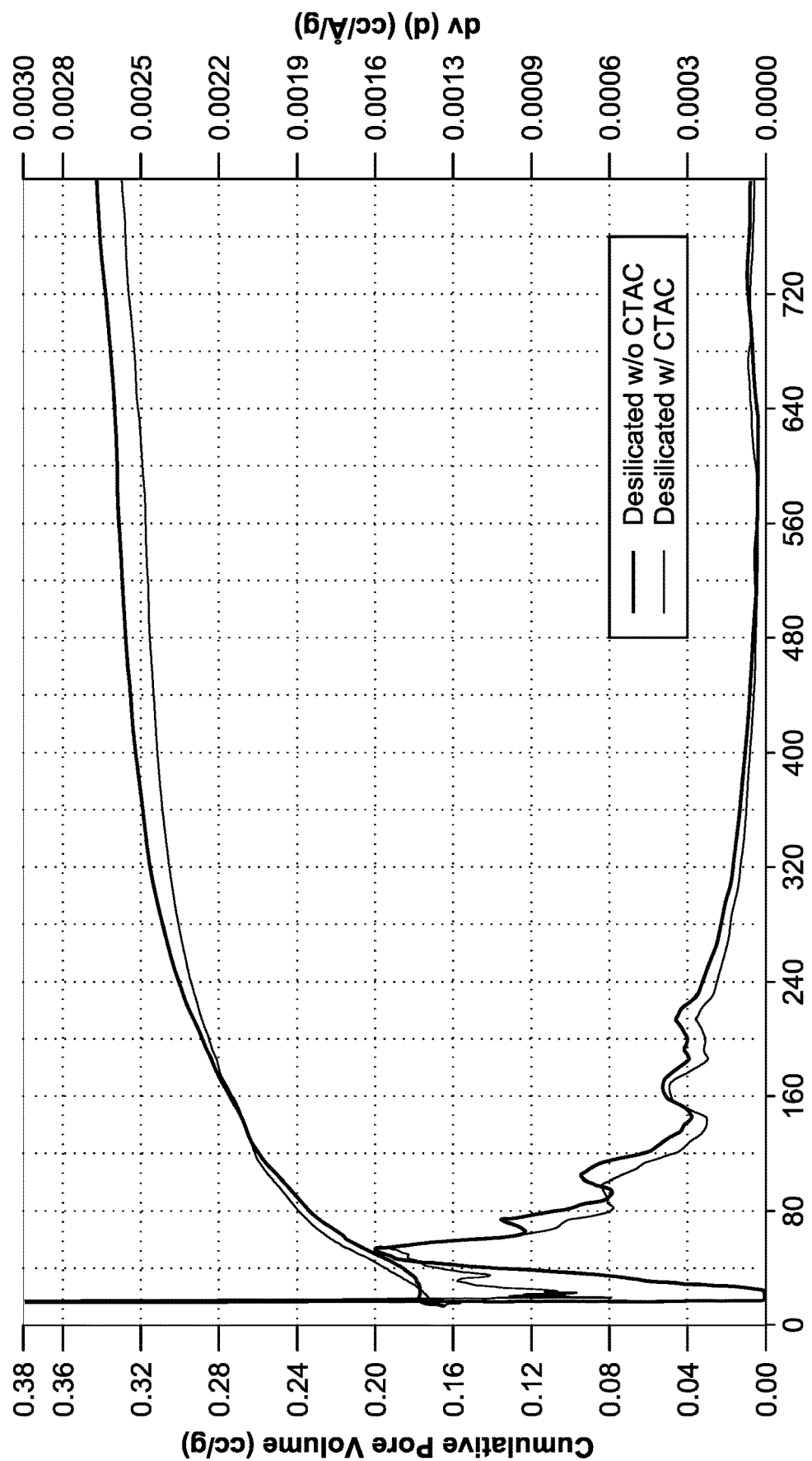
FIG. 4 depicts NLDFT pore size distributions of the treated zeolites in Example 6.

In this study, the mesoporosity introduced by desilication with or without surfactant to the initial zeolite (instead of the corresponding low SAR zeolite) was compared. In one experiment, ZSM-5 (CV3024E from Zeolyst International) was treated with a NaOH solution (13% solid, 4.5 mmol/g NaOH at 80° C. for 4 hours) to yield a desilicated zeolite. In another experiment, surfactant (CTAC at 0.3 g/g zeolite) was also added while all other conditions were the same as the first experiment. As shown in FIG. 3, the mesopore size distribution of the two zeolites was very similar. It was concluded that under the reaction conditions, desilication was the dominating process at introducing mesoporosity even with the use of CTAC. FIG. 4 depicts the corresponding NLFDT pore size distributions calculated from the adsorption isotherms of the treated zeolites.

TABLE 2

| Sample | XRD % | SAR | 0-20 Å cc/g | 20-80 Å cc/g | 20-300 Å cc/g | nPA-TPD | Meso Ratio | dV/log(D) |
|---|---|---|---|---|---|---|---|---|
| CBV2314 | 100 | 24.1 | 0.20 | 0.01 | 0.02 | 1.20 | 0.55 | 0.04 |
| NaOH Desilicated | 60 | 14.6 | 0.16 | 0.08 | 0.11 | 1.27 | 0.67 | 0.19 |
| $H_2SO_4$Dealuminated | 61 | 37.1 | 0.16 | 0.08 | 0.14 | N/A | 0.56 | 0.22 |
| Rived (calcined) | 60 | 36.1 | 0.14 | 0.15 | 0.23 | 0.79 | 0.65 | 0.91 |

Example 5

In this study, 1136.4 g of ZSM-5 (CBV2314 from Zeolyst International) was treated in 720 g of 50% NaOH solution (hydroxide dose at 9 mmol/g level) and 4,000 g of water at 80° C. for 4 hours, which yielded a desilicated ZSM-5 that had a SAR of 13.5 and relative crystallinity of 54%. Following $H_2SO_4$ treatment at 80° C. for 3 hours at 3 different severities (0.3, 0.45, and 0.6 M concentrations), the acid-

Example 7

Figure 5:
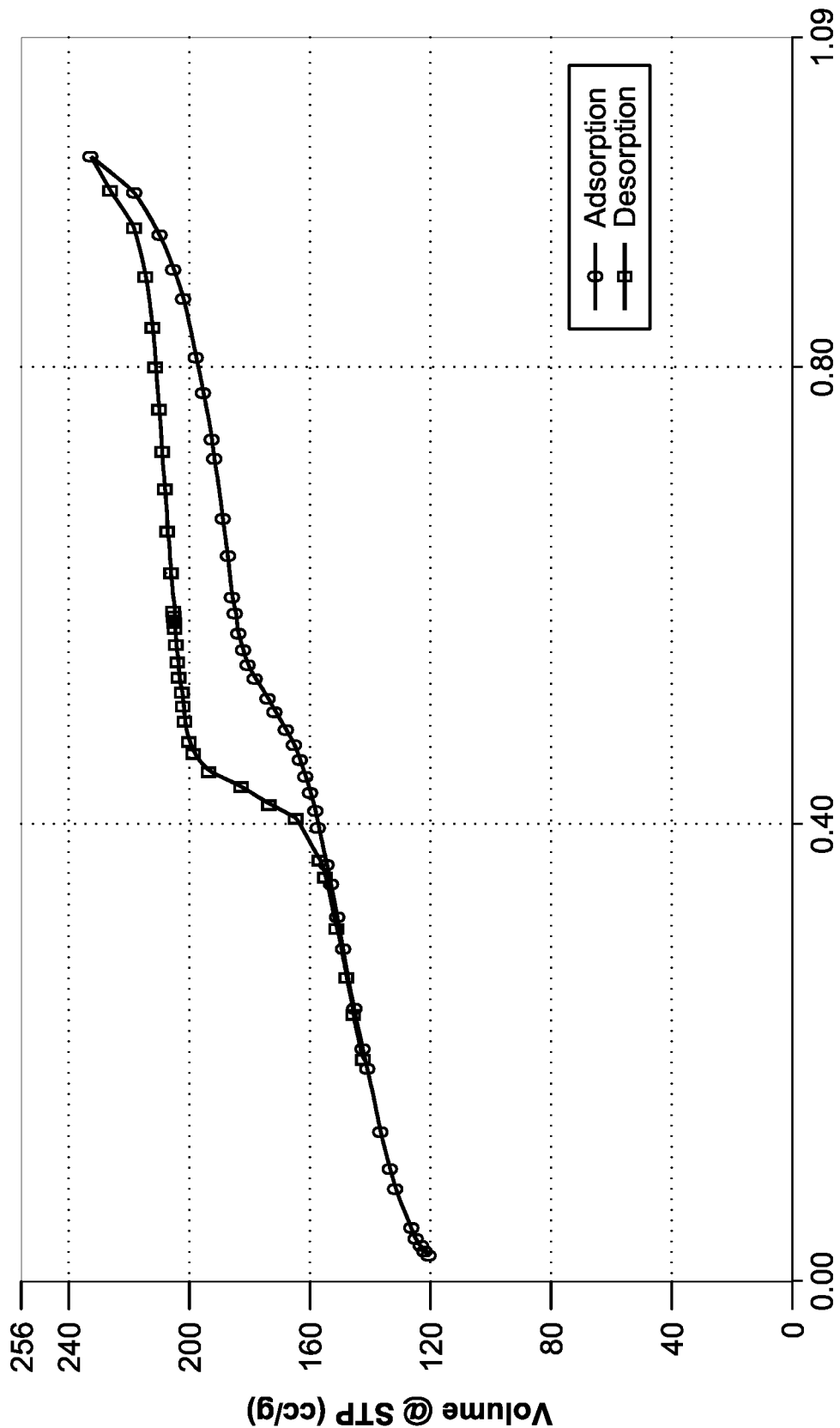
FIG. 5 depicts the Ar sorption isotherms of the treated zeolite in Example 7.
Figure 6:
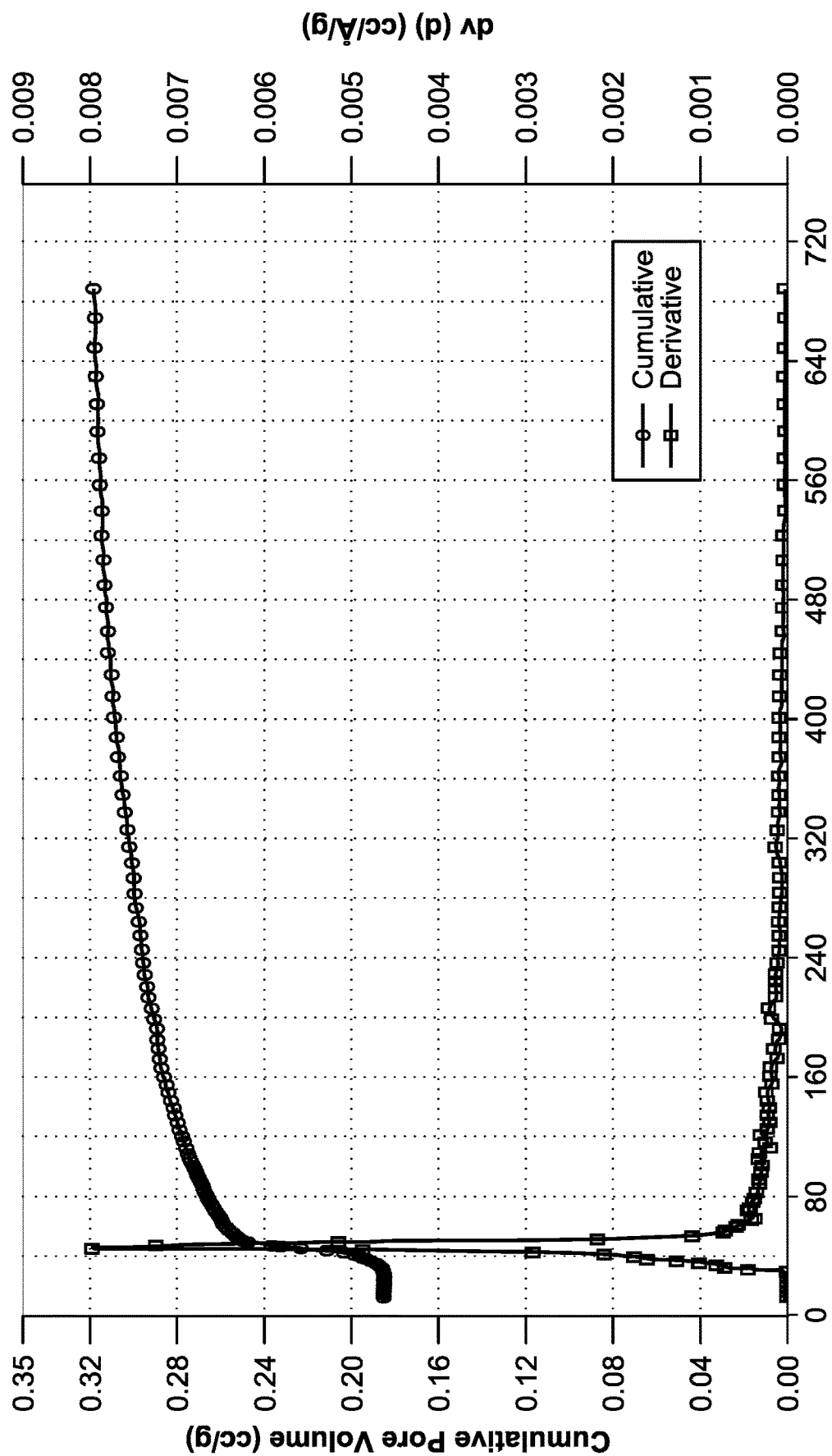
FIG. 6 depicts NLDFT pore size distributions of the treated zeolite in Example 7.

In this study, 1,060 g of mordenite (CBV10A from Zeolyst International) was slurried in 2,411 g of deionized water and heated to 80° C. Afterwards, 215 g of 50% NaOH was then added to the slurry and the mixture was stirred at 80° C. for 24 hours. After filtration and washing, the desilicated mordenite was dried overnight at 80° C. Subsequently, 18 g of the desilicated mordenite was then added into 180 mL of 0.35 M H$_2$SO$_4$ at 80° C. and stirred for 3 hours. After filtration and washing, 14 g of the acid-treated mordenite was then added into 72 g water. Then 20 g of 30% CTAC was added and the pH of the slurry was adjusted to 7.0, after which 48 g 50% NaOH was then added to the slurry and the mixture was stirred for 2 hours at 80° C. before filtration and washing. Finally, Na$_2$O and surfactant removal was then accomplished by four solvent extractions by isopropanol azeotrope at refluxing temperature. As shown in Table 4 and FIGS. 5 and 6, the resulting product was a mesostructured mordenite. FIG. 5 depicts the Ar sorption isotherm of the mesostructured product, while FIG. 6 depicts the NLDF pore size distribution calculated from the adsorption isotherms.

As shown in Table 4, argon sorption was used to characterize the porosity of the zeolites. The starting initial zeolite was used as the crystallinity standard. BET surface area was calculated from the Ar sorption results. ZSA and MSA were calculated using t-plot method also from the Ar sorption results. All pore volumes (0-20 Å, 20-80 Å, and 20-300 Å, all in cc/g) were calculated using the NLDFT module in the QuadraWin program provided by Quantachrome Instruments from the Ar sorption results.

TABLE 4

| Sample | XRD % | SAR | 0-20 Å cc/g | 20-80 Å cc/g | 20-300 Å cc/g | Meso Ratio | dV/log(D) | ZSA m$^2$/g | MSA m$^2$/g | BET m$^2$/g |
|---|---|---|---|---|---|---|---|---|---|---|
| CBV10A | 100 | 13.2 | 0.16 | 0.01 | 0.02 | 0.63 | 0.03 | 302 | 32 | 334 |
| Desilicated CBV10A | 90 | 11.4 | N/A | N/A | N/A | N/A | N/A | N/A | N/A | N/A |
| Dealuminated | N/A | 17.4 | N/A | N/A | N/A | N/A | N/A | N/A | N/A | N/A |
| Mesostructured | 98 | 17.1 | 0.18 | 0.08 | 0.12 | 0.69 | 0.81 | 319 | 149 | 468 |

Example 8

In this study, it was shown that the desilication pretreatment could also be applied to Y zeolite. Specifically, a slurry with 25% solids of NaY zeolite (provided by W. R. Grace) was added to a 50% NaOH solution at 6 mmol NaOH/g zeolite at 80° C. The reaction was stirred at 80° C. for 18 hours before it was filtered and washed thoroughly. Then 46 g of the desilicated NaY zeolite ("NaY-D") was mixed with 83 g water and magnetically stirred and heated to 80° C. After adjusting the pH of the slurry to ~7 using 3M HNO$_3$, 44.4 g of 23% citric acid was pumped in over 1 hour. The reaction mixture was stirred for another 2 hours at 80° C. before it was filtered and washed. The acid-treated zeolite cake ("NaY-DA") was mixed with water and 30% CTAC solution at (0.1 g CTAC/g zeolite level). The mixture was stirred and heated to 80° C. The pH of the slurry was then adjusted to 7 using 50% NaOH, followed by addition of another dose of 50% NaOH at 0.38 mmol NaOH/g zeolite level. The reaction mixture was stirred at 80° C. for an hour before it was filtered and washed thoroughly. After reducing the % Na$_2$O to ~2.5% by ion exchange with NH$_4$NO$_3$ solution, the dried zeolite was then ultrastablized at 550° C. and 100% steam for 2 hours, followed by calcinations in flowing air for another 2 hours. After further reducing the % Na$_2$O by another ion exchange with NH$_4$NO$_3$ solution, the final USY product was obtained ("USY-R"), which has the same SAR (aluminum content) as the starting NaY zeolite.

The main properties of the zeolites depicted above are shown in Table 5. Conceivably, by varying the severity of the desilication pre-treatment and the severity of the dealumination, mesoporous zeolite Y with different chemical compositions (SAR) and micro/meso porosity combinations can be obtained. Argon sorption was used to characterize the porosity of the zeolites. The starting initial zeolite was used as the crystallinity standard. BET surface area was calculated from the Ar sorption results. ZSA and MSA were calculated using t-plot method also from the Ar sorption results. All pore volumes (0-20 Å, 20-80 Å, and 20-300 Å, all in cc/g) were calculated using the NLDFT module in the QuadraWin program provided by Quantachrome Instruments from the Ar sorption results.

TABLE 5

| Sample | % XRD | SAR | UCS | 0-20 Å cc/g | 20-80 Å cc/g | 20-300 Å cc/g | Meso Ratio | dV/log(D) | ZSA m$^2$/g | MSA m$^2$/g | BET m$^2$/g |
|---|---|---|---|---|---|---|---|---|---|---|---|
| NaY | 100 | 5.6 | 24.65 | 0.36 | 0.01 | 0.02 | 0.46 | 0.05 | 832 | 25 | 857 |
| NaY-D | 94 | 4.1 | 24.73 | 0.37 | 0.01 | 0.02 | 0.29 | 0.13 | 890 | 46 | 936 |
| NaY-DA | 78 | 5.8 | 24.68 | 0.36 | 0.02 | 0.05 | 0.48 | 0.22 | 870 | 87 | 957 |
| USY-R | 85 | 5.6 | 24.54 | 0.28 | 0.08 | 0.12 | 0.65 | 0.23 | 645 | 157 | 801 |

Example 9

This example demonstrated that the sizes of the mesopores introduced during the surfactant treatment step corresponded to the size of the surfactants. A starting desilicated CBV2314 (from Zeolyst International) was subjected to an acid treatment (0.4 M $H_2SO_4$, 12 cc/g zeolite, 80° C. for 3 hours) and then the resulting mixture was filtered and washed three times with hot deionized water. The acid-treated zeolite was then divided into two portions and added to a CTAC (cetyltrimthylammonium chloride) solution in water (0.5 g CTAC/g zeolite) for one reaction and to a BTAC (behenyltrimethylammonium chloride) solution in water (0.5 g BTAC/g zeolite) in the other reaction. Both mixtures were heated to 80° C. After adjusting the pH of the mixtures to 7 using a 50% NaOH solution, additional 50% NaOH solution (0.75 mmol NaOH/g zeolite) was added and the mixtures were heated with stirring for 1 hour. The reaction mixtures were then filtered and washed three times with hot deionized water. After being dried at 80° C. overnight, the zeolites were then treated with a $NH_4NO_3$ solution to reduce the $Na_2O$ % to below 0.2% (as measured by XRF). The zeolites were then dried again and calcined under flowing nitrogen at 550° C. for 2 hours and flowing air at 550° C. for another 2 hours to remove the surfactants.

Argon sorption was used to characterize the porosity of the zeolites. The starting initial zeolites were used as the crystallinity standard. BET surface area was calculated from the Ar sorption results. ZSA and MSA were calculated using t-plot method and the Ar sorption results. All pore volumes (0-20 Å, 20-80 Å, and 20-300 Å, all in cc/g) were calculated using the NLDFT module in the QuadraWin program provided by Quantachrome Instruments from the Ar sorption results.

Figure 7:
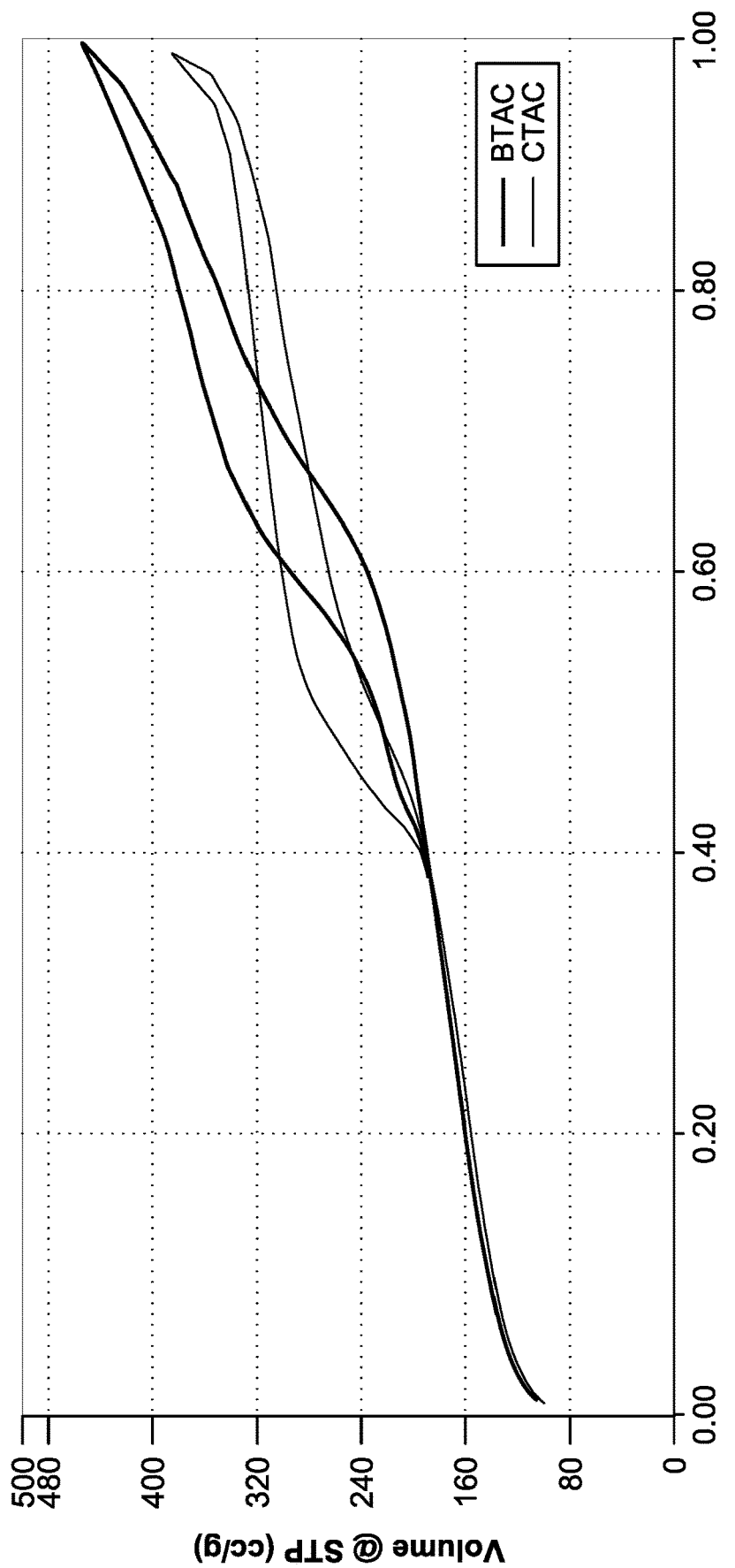
FIG. 7 depicts the Ar sorption isotherms of the treated zeolites in Example 9.
Figure 8:
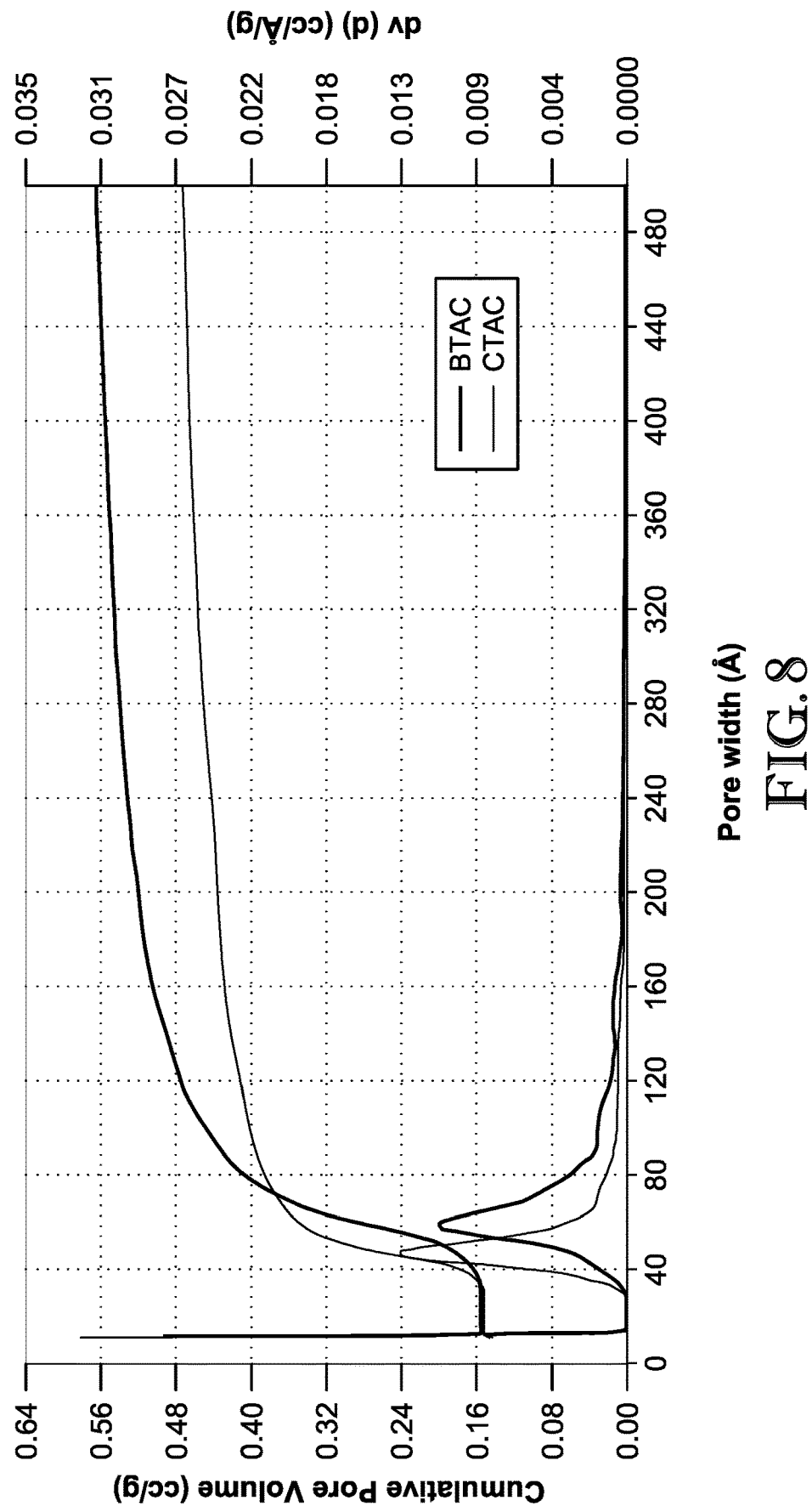
FIG. 8 depicts NLDFT pore size distributions of the treated zeolites in Example 9.

FIG. 7 depicts the Ar sorption isotherm at 87 K of the CTAC-treated and BTAC-treated zeolites, while FIG. 8 depicts the NLDFT pore size distributions calculated from the adsorption isotherms. As shown in FIG. 8, the NLDFT pore size distribution suggested that the sizes of the mesopores in the two zeolites corresponded to the sizes of the surfactants used in the reactions: CATC-treated (~4.5 nm) and BTAC-treated (~5.5 nm).

Table 6, below, depicts the properties of the desilicated starting zeolite, the acid-treated zeolite, the CTAC-treated zeolite, and the BTAC-treated zeolite.

TABLE 6

| Sample Names | % XRD | SAR | 0-20 Å cc/g | 20-80 Å cc/g | 20-300 Å cc/g | ZSA $m^2/g$ | MSA $m^2g$ | BET $m^2/g$ | Meso Ratio | dV/ log(D) |
|---|---|---|---|---|---|---|---|---|---|---|
| Desilicated | 63 | 15.1 | 0.08 | 0.04 | 0.12 | 131 | 77 | 208 | 0.29 | 0.18 |
| Acid-treated | 60 | 29.6 | 0.17 | 0.04 | 0.13 | 287 | 129 | 415 | 0.31 | 0.21 |
| CTAC-Treated | 67 | 27.8 | 0.14 | 0.23 | 0.30 | 180 | 285 | 475 | 0.77 | 1.40 |
| BTAC-Treated | 65 | 27.8 | 0.15 | 0.25 | 0.39 | 197 | 291 | 488 | 0.65 | 1.45 |

Example 10

Figure 9:
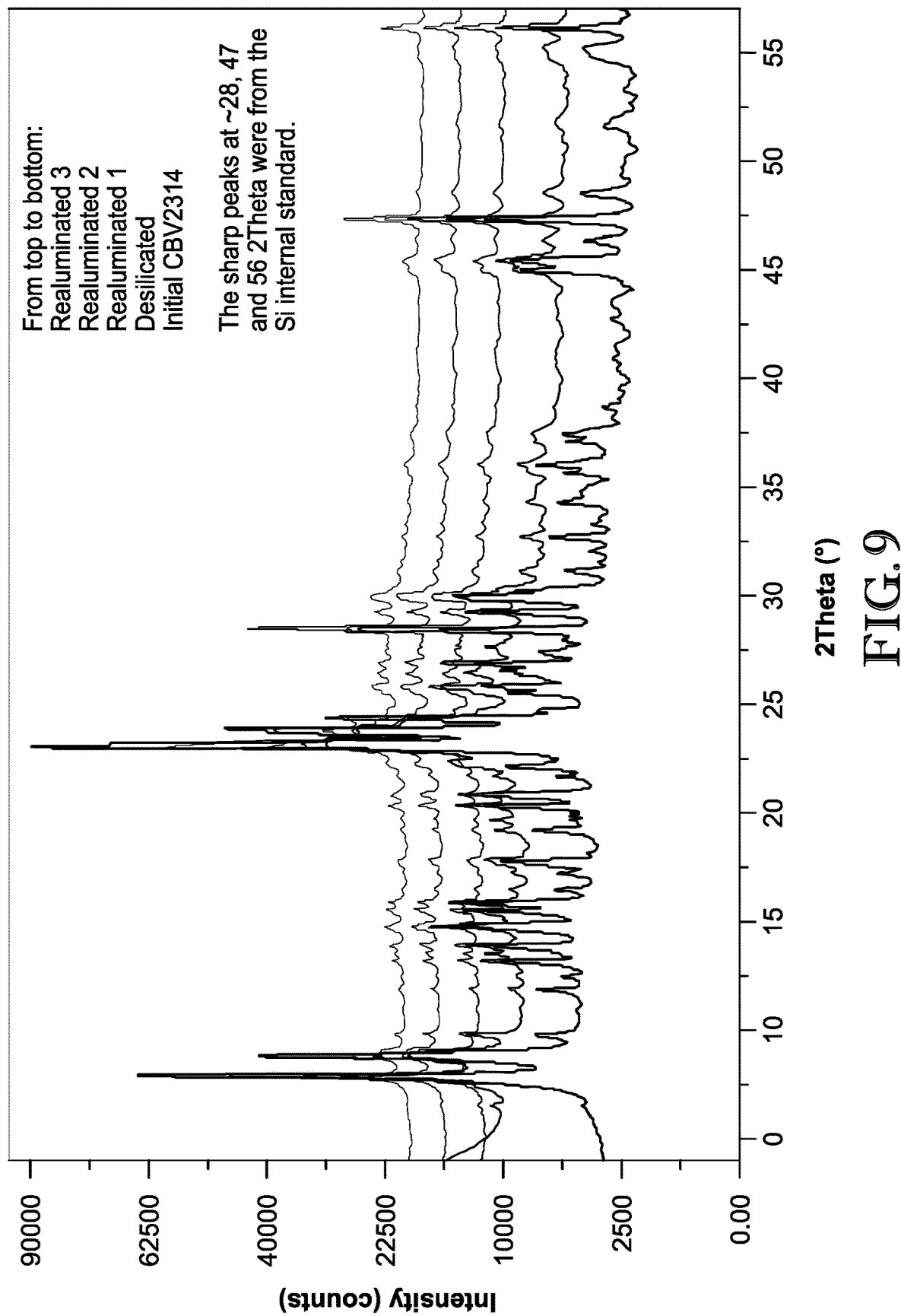
FIG. 9 depicts powder X-ray diffraction patterns of the samples in Example 10.

This example demonstrates the effects of realumination together with desilication to reduce the silica to alumina molar ratio of an initial zeolite. In this example, 28.4 g of CBV2314 (Zeolyst International) was added to 100 g of deionized water. After being heated to 80° C., the pH of the slurry was adjusted to 7 and a mixture of 17.4 g of 50% NaOH and 0.61 g $NaAlO_2$ was added to the reaction with stirring. After 4 hours, the reaction was filtered and washed with hot deionized water. In two separate experiments, the same amounts of CBV2314 and deionized water were used and the same procedure was followed except that 16.85 g 50% NaOH and 1.23 g $NaAlO_2$ was used in the second reaction and 16.2 g 50% NaOH and 1.84 g $NaAlO_2$ was used in the third reaction. In both experiments, the total hydroxide doses were maintained at 9 mmol/g. The results in Table 7 suggest that realumination together with desilication worked to further reduce the silica to alumina molar ratio compared to desilication only as described in Example 5. Furthermore, the powder X-ray diffraction patterns shown in FIG. 9 demonstrate that all zeolites maintained the ZSM-5 structure. It should be noted that the sharp peak at ~28, 47, and 56 2-Theta in FIG. 9 are from Si internal standard added to the samples.

TABLE 7

| Sample | XRD % | SAR | 0-20 Å cc/g | 20-80 Å c/g | 20-300 Å cc/g | ZSA $m^2/g$ | MSA $m^2/g$ | BET $m^2/g$ |
|---|---|---|---|---|---|---|---|---|
| Desilicated CBV2314 | 54 | 13.5 | 0.09 | 0.04 | 0.13 | 137 | 93 | 229 |
| Realuminated 1 | 49 | 11.2 | 0.11 | 0.06 | 0.10 | 172 | 109 | 281 |
| Realuminated 2 | 48 | 9.9 | 0.11 | 0.06 | 0.16 | 170 | 132 | 302 |
| Realuminated 3 | 40 | 8.9 | 0.09 | 0.05 | 0.14 | 140 | 107 | 247 |

Example 11

This example demonstrates that a sequential desilication step followed by a realumination step can effectively lower the SAR of a starting zeolite (CBV2314 with a SAR of ~24). In this study, 285.1 g (250 g on dry basis) of CBV2314 was added into 900 g of DI water at 65° C. with stirring. After adjusting the pH of the slurry to ~7.0, 130 g of 50% NaOH was added. After 30 minutes at 65° C., the reaction mixture was vacuum filtered and washed 20 times with hot DI water. The resulting desilicated ZSM-5 product had a SAR of 16.8.

Subsequently, 135.1 g of the desilicated ZSM-5 (62.4 g on a dry basis) was then added to 177 g of DI water at 65° C. with stirring. Afterwards, 6.14 g of $NaAlO_2$ (99%) was then added. After 3 hours at 65° C., the reaction mixture was vacuum filtered and washed 20 times with hot DI water. The solid was then dried at room temperature to obtain a realuminated ZSM-5 having a SAR of 10.8.

Afterwards, 38 g (20 g on a dry basis) of the realuminated ZSM-5 was then added into 55.3 g of DI water at 80° C. with stirring. Subsequently, 22.4 g of 70% $H_2SO_4$ was then added. After 1 hour at 80° C., the reaction mixture was vacuum filtered and washed 3 times with hot DI water. The SAR of the dealuminated ZSM-5 was then raised to 37.4.

Next, 25.4 g (11.5 g on a dry basis) of the dealuminated ZSM-5 obtained as described above was added to 37.1 g of DI water 80° C. with stirring. Afterwards, 19.2 g of 30%

Figure 10:
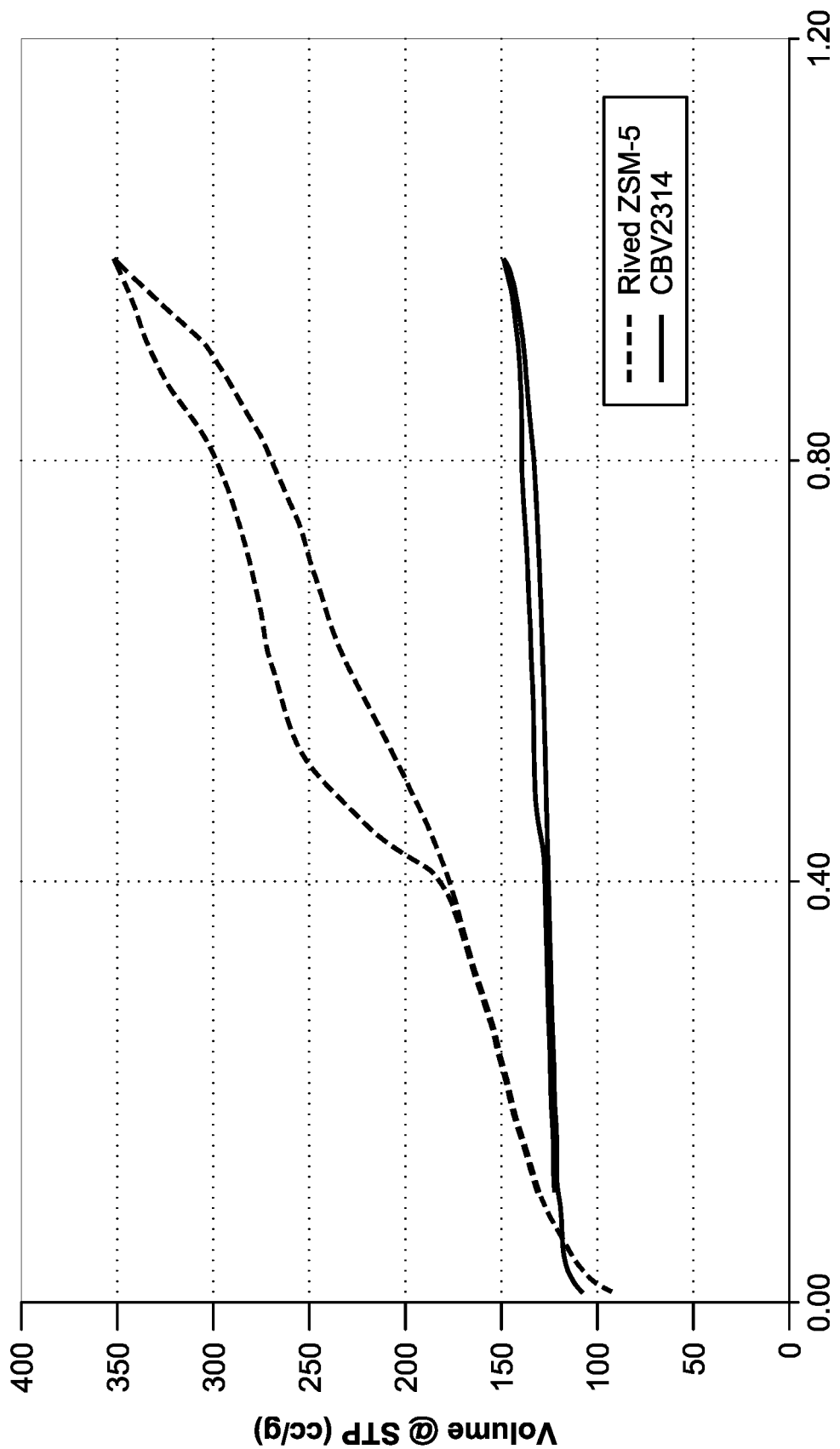
FIG. 10 depicts the Ar sorption isotherms of the treated zeolites in Example 11.

CTAC was then added. After adjusting the pH to ~7, 1.38 g of 50% NaOH was added. After 1 hour at 80° C., the reaction mixture was vacuum filtered and washed 3 times with hot DI water. The resulting material was then calcined in static air to remove the surfactant (1° C./min from room temperature to 600° C. and then held at 600° C. for 2 hours before cooling to room temperature). The textural properties of the ZSM-5 zeolites during the study are listed below in Table 8. The inflection at P/Po around 0.4-0.7 in the adsorption isotherm is clearly observable in FIG. 10, which demonstrates the surfactant-templated mesoporosity.

TABLE 8

| Sample | XRD % | SAR | 0-20 Å cc/g | 20-80 Å c/g | 20-300 Å cc/g | ZSA $m^2/g$ | MSA $m^2/g$ | BET $m^2/g$ |
|---|---|---|---|---|---|---|---|---|
| CBV2314 | 100 | 24.1 | 0.20 | 0.01 | 0.02 | 393 | 37 | 430 |
| Desilicated ZSM-5 | 74 | 16.8 | 0.14 | 0.06 | 0.17 | 224 | 136 | 359 |
| Realuminated ZSM-5 | 65 | 10.8 | 0.12 | 0.07 | 0.16 | 187 | 133 | 320 |
| Dealuminated ZSM-5 | N/A | 37.4 | N/A | N/A | N/A | N/A | N/A | N/A |
| Rived ZSM-5 | 80 | 33.7 | 0.13 | 0.20 | 0.30 | 139 | 303 | 442 |

Example 12

This example demonstrates that desilication and realumination can also be carried out in a single step treatment with both NaOH and NaAlO$_2$. In this example, 1146.8 g (1,000 g on a dry basis) of CBV2314 was added to 2,639.0 g of DI water at 65° C. with stirring. Afterwards, 109.8 g of 99% NaAlO$_2$ and 428.8 g of 50% NaOH were mixed and added to the reaction mixture. After 3 hours at 65° C., the reaction mixture was vacuum filtered, washed 20 times with hot Di water, and dried at room temperature overnight. The SAR of the resulting DeSil-ReAl ZSM-5 was reduced to 9.4.

Subsequently, 1,900 g of the DeSil-ReAl ZSM-5 (787 g on a dry basis) was added to 1,867.8 g of DI water at 80° C. with stirring. Next, 550.7 g of 70% H$_2$SO$_4$ was then added. After 1 hour at 80° C., the mixture was filtered, washed, and dried at room temperature overnight. The SAR of the dealuminated ZSM-5 was raised to 27.9.

Figure 11:
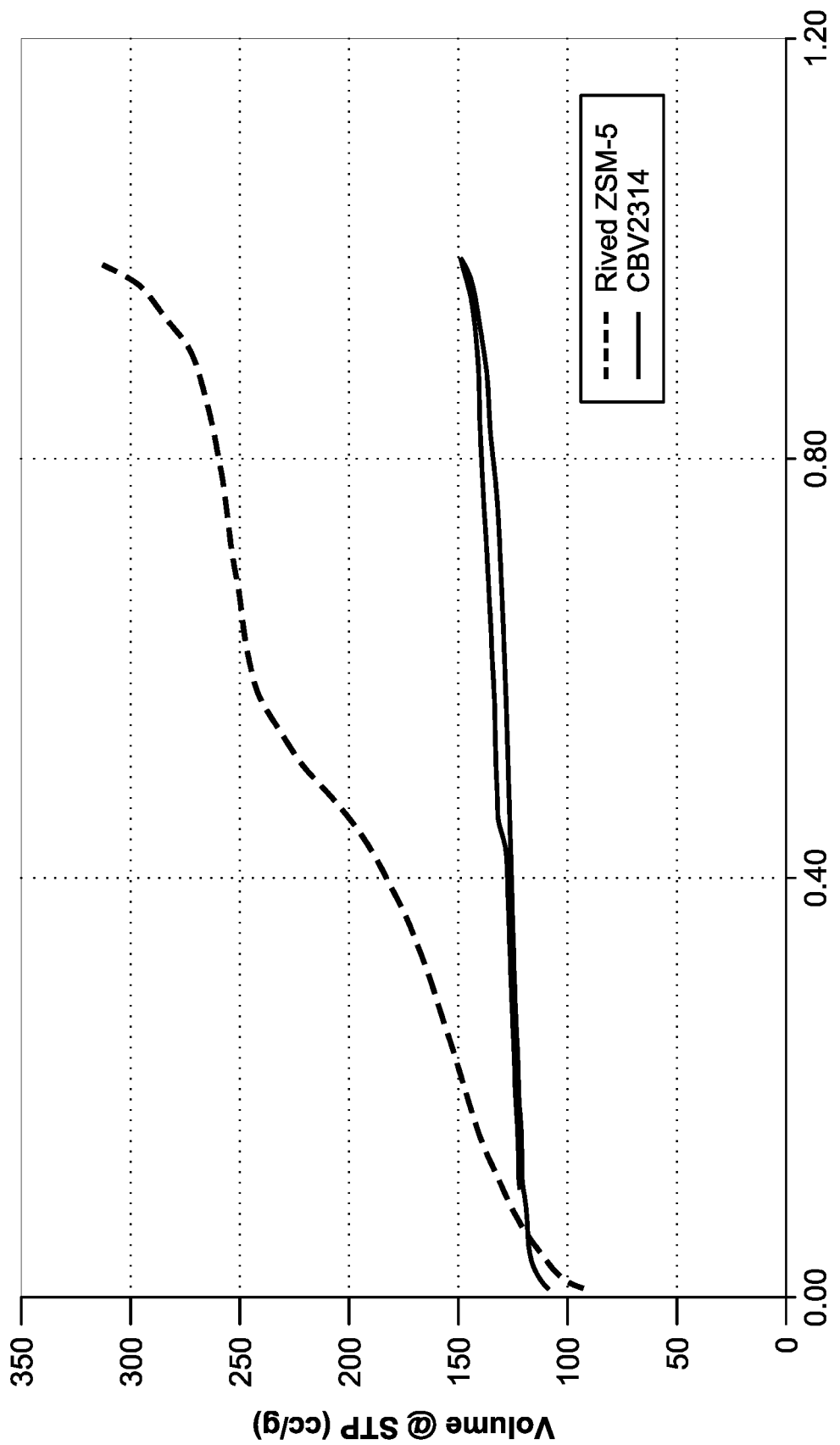
FIG. 11 depicts the Ar sorption isotherms of the treated zeolites in Example 12.

Next, 1,040 g (529 on a dry basis) of the dealuminated ZSM-5 was then added to 1,855.6 g of DI water at 80° C. with stirring. Subsequently, 882.3 g of 30% CTAC was then added and the pH of the slurry was adjusted to 7. Afterwards, 31.8 g of 50% NaOH was then added. After 1 hour at 80° C., the reaction mixture was filtered, washed with hot DI water, and then dried at 80° C. overnight. The rived ZSM-5 was then calcined in static air to remove surfactant (1° C./min from room temperature to 550° C. and then held at 550° C. for 2 hours before cooling to room temperature). Textural properties of the zeolites are listed below in Table 9. The inflection at P/Po around 0.4-0.7 in the adsorption isotherm as shown in FIG. 11 is very clear, which demonstrates the surfactant-templated mesoporosity.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

What is claimed is:

1. A low SAR zeolite, wherein said low SAR zeolite is selected from the group consisting of a ZSM-5 having a silica to alumina molar ratio of 17 or less, wherein said low SAR zeolite has a total 20 to 300 Å diameter mesopore volume of at least 0.08 cc/g and a dV/log(d) of at least 0.19.

2. The low SAR zeolite of claim 1, wherein said low SAR zeolite has a mesopore ratio in the range of 0.1 to 0.9.

3. The low SAR zeolite of claim 1, wherein said low SAR zeolite has a total 20 to 300 Å diameter mesopore volume in the range of 0.10 to 0.70 cc/g.

4. The low SAR zeolite of claim 1, wherein said low SAR zeolite has a dV/log(d) in the range of 0.3 to 100 and a mesopore ratio in the range of 0.2 to 1.2.

5. A mesoporous zeolite, comprising a ZSM-5 zeolite having a silica to alumina molar ratio of 17 or less, wherein said mesoporous zeolite has a dV/log(d) in the range of 0.3

TABLE 9

| Sample | XRD % | SAR | 0-20 Å cc/g | 20-80 Å c/g | 20-300 Å cc/g | ZSA $m^2/g$ | MSA $m^2/g$ | BET $m^2/g$ |
|---|---|---|---|---|---|---|---|---|
| CBV2314 | 100 | 24.1 | 0.20 | 0.01 | 0.02 | 393 | 37 | 430 |
| DeSil-ReAl ZSM-5 | 51 | 9.4 | 0.11 | 0.06 | 0.13 | 157 | 130 | 287 |
| Dealuminated ZSM-5 | 65 | 27.9 | 0.16 | 0.09 | 0.17 | 225 | 213 | 438 |
| Rived ZSM-5 | 73 | 27.4 | 0.13 | 0.20 | 0.25 | 127 | 315 | 442 | to 100, a mesopore ratio in the range of 0.2 to 1.2, and a total 20 to 300 Å diameter mesopore volume of at least 0.08 cc/g.

6. The mesoporous zeolite of claim 5, wherein said mesoporous zeolite has a crystalline content of at least 20 weight percent as measured by XRD.

7. The mesoporous zeolite of claim 5, wherein said mesoporous zeolite has a total 20 to 80 Å diameter mesopore volume of at least 0.05 cc/g.

8. The mesoporous zeolite of claim 5, wherein said mesoporous zeolite has a total 20 to 300 Å diameter mesopore volume of at least 0.10 cc/g.

9. The low SAR zeolite of claim 5, wherein said mesoporous zeolite is said ZSM-5 having a silica to alumina molar ratio in the range of 2 to 16.

* * * * *